(12) United States Patent
Nam et al.

(10) Patent No.: US 10,498,509 B2
(45) Date of Patent: *Dec. 3, 2019

(54) CSI FEEDBACK FOR MIMO WIRELESS COMMUNICATION SYSTEMS WITH POLARIZED ACTIVE ANTENNA ARRAY

(71) Applicant: Samsung Electronics Co., Ltd, Suwon-si (KR)

(72) Inventors: Young-Han Nam, Plano, TX (US); Yang Li, Plano, TX (US); Eko Onggosanusi, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,187

(22) Filed: Sep. 21, 2018

(65) Prior Publication Data

US 2019/0028254 A1    Jan. 24, 2019

Related U.S. Application Data

(63) Continuation of application No. 14/874,216, filed on Oct. 2, 2015, now Pat. No. 10,084,579.
(Continued)

(51) Int. Cl.
*H04Q 7/00* (2006.01)
*H04L 5/00* (2006.01)
(Continued)

(52) U.S. Cl.
CPC ......... *H04L 5/0048* (2013.01); *H04B 7/0456* (2013.01); *H04B 7/0478* (2013.01);
(Continued)

(58) Field of Classification Search
CPC .. H04L 5/0048; H04W 72/046; H04B 7/0478; H04B 7/0456; H04B 7/0632; H04B 7/0639; H04B 7/0617
(Continued)

(56) References Cited

U.S. PATENT DOCUMENTS 10,084,579 B2 * 9/2018 Nam .................... H04B 7/0456
2016/0269084 A1 * 9/2016 Nam .................... H04B 7/0417
(Continued)

*Primary Examiner* — Chuong T Ho

(57) ABSTRACT

A base station capable of communicating with a user equipment (UE) includes a transceiver configured to transmit 8-port Channel State Information-Reference Signal (CSI-RS) according to a CSI-RS configuration for the UE, and downlink signals containing the CSI-RS configuration on physical downlink shared channels (PDSCH), and receive, from the UE, uplink signals containing Precoder Matrix Indicator (PMI) derived using the 8-port CSI-RS, and a controller configured to convert the PMI to one of predetermined precoding vectors. A user equipment includes a transceiver configured to receive downlink signals containing a CSI-RS configuration on PDSCH transmitted by the BS, and 8-port CSI-RS according to the CSI-RS configuration, and transmit uplink signals containing a PMI, a controller configured to decode the CSI-RS configuration from the downlink signals, and derive the PMI by utilizing channel estimates based on the 8-port CSI-RS, the PMI mapped to one of precoding vectors.

19 Claims, 11 Drawing Sheets

Related U.S. Application Data

(60) Provisional application No. 62/080,832, filed on Nov. 17, 2014, provisional application No. 62/085,057, filed on Nov. 26, 2014, provisional application No. 62/111,475, filed on Feb. 3, 2015, provisional application No. 62/113,612, filed on Feb. 9, 2015, provisional application No. 62/128,196, filed on Mar. 4, 2015, provisional application No. 62/174,822, filed on Jun. 12, 2015.

(51) Int. Cl.
*H04B 7/06* (2006.01)
*H04B 7/0456* (2017.01)
*H04W 72/04* (2009.01)

(52) U.S. Cl.
CPC ......... *H04B 7/0617* (2013.01); *H04B 7/0632* (2013.01); *H04B 7/0639* (2013.01); *H04W 72/046* (2013.01)

(58) Field of Classification Search
USPC .................................................. 370/329, 330
See application file for complete search history.

(56) References Cited

U.S. PATENT DOCUMENTS

2018/0248720 A1* 8/2018 Park ...................... H04B 7/0473
2019/0028254 A1* 1/2019 Nam .................... H04B 7/0456

* cited by examiner (a) Resource index grid (b) Partition of an element in a coarse grid into multiple elements in a fine grid

CSI FEEDBACK FOR MIMO WIRELESS COMMUNICATION SYSTEMS WITH POLARIZED ACTIVE ANTENNA ARRAY

CROSS-REFERENCES TO RELATED APPLICATIONS AND CLAIMS OF PRIORITY

This application is a continuation of U.S. Non-Provisional patent application Ser. No. 14/874,216 filed Oct. 2, 2015 and entitled CSI FEEDBACK FOR MIMO WIRELESS COMMUNICATION SYSTEMS WITH POLARIZED ACTIVE ANTENNA ARRAY, and claims priority to U.S. Provisional Patent Application No. 62/080,832 filed on Nov. 17, 2014, U.S. Provisional Patent Application No. 62/085,057 filed on Nov. 26, 2014, U.S. Provisional Patent Application No. 62/111,475 filed on Feb. 3, 2015, U.S. Provisional Patent Application No. 62/113,612 filed on Feb. 9, 2015, U.S. Provisional Patent Application No. 62/128,196 filed on Mar. 4, 2015, and U.S. Provisional Patent Application No. 62/174,822 filed on Jun. 12, 2015. The above-identified provisional patent applications are hereby incorporated by reference in their entirety.

TECHNICAL FIELD

The present disclosure relates generally to a codebook design and structure associated with a two dimensional transmit antennas array. Such two dimensional arrays are associated with a type of multiple-input-multiple-output (MIMO) system often termed "full-dimension" MIMO (FD-MIMO).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

In one aspect in accordance with the present disclosure, a base station capable of communicating with a user equipment (UE) includes a transceiver configured to transmit 8-port Channel State Information-Reference Signal (CSI-RS) according to a CSI-RS configuration for the UE, and downlink signals containing the CSI-RS configuration on physical downlink shared channels (PDSCH), and receive, from the UE, uplink signals containing Channel State Information (CSI) derived from the 8-port CSI-RS, and a controller configured to map the CSI to one of predetermined precoding vectors including $$\begin{bmatrix} 1 & 0 & 0 & 0 & \exp\left(j\frac{2\pi m}{4}\right) & 0 & 0 & 0 \end{bmatrix}^t, m = 0, 1, 2, 3.$$

In a second embodiment, a user equipment includes a transceiver configured to receive downlink signals containing a CSI-RS configuration on PDSCH transmitted by the BS, and 8-port CSI-RS according to the CSI-RS configuration, and transmit uplink signals containing Channel State Information (CSI), a controller configured to decode the CSI-RS configuration from the downlink signals, and derive the CSI by utilizing channel estimates based on the 8-port CSI-RS, the CSI mapped to one of precoding vectors including $$\begin{bmatrix} 1 & 0 & 0 & 0 & \exp\left(j\frac{2\pi m}{4}\right) & 0 & 0 & 0 \end{bmatrix}^t, m = 0, 1, 2, 3.$$

In a third embodiment, A method for communicating with a user equipment (UE), the method comprising transmitting 8-port Channel State Information-Reference Signal (CSI-RS) according to a CSI-RS configuration for the UE, and downlink signals containing the CSI-RS configuration on physical downlink shared channels (PDSCH), and receiving, from the UE, uplink signals containing Channel State Information (CSI) derived from the 8-port CSI-RS, and mapping the CSI to one of predetermined precoding vectors including $$\begin{bmatrix} 1 & 0 & 0 & 0 & \exp\left(j\frac{2\pi m}{4}\right) & 0 & 0 & 0 \end{bmatrix}^t, m = 0, 1, 2, 3.$$

In some embodiments, two CSI-RS on antenna ports 15 and 19 among the 8-port CSI-RS are respectively mapped onto a first and a second groups of a same number of antenna elements with substantially similar beamforming weight vectors being applied, wherein an antenna element on the first group is polarized according to a first angle, an antenna element on the second group is polarized according to a second angle, and the two antenna elements on the first and the second groups are on a same physical location comprising a dual-polarized pair, and wherein the difference between the first and the second angles is substantially equal to 90 degrees.

In some embodiments, each of the 8-port CSI-RS is beamformed with a beamforming weight vector estimated with sounding reference signals (SRS) transmitted by the UE.

In some embodiments, the CSI-RS is beamformed with a beamforming weight vector, and wherein the controller is further configured to derive the beamforming weight vector by processing a precoding vector reported by the UE.

In some embodiments, the transceiver is further configured to transmit downlink signals containing a second CSI-RS configuration on PDSCH, and N-port CSI-RS according to the second CSI-RS configuration, the N being a positive integer, and receive, from the UE, uplink signals containing a second CSI comprising a nonnegative integer derived from the $N_2$-port CSI-RS, and wherein the controller is further configured to determine the precoding vector as an oversampled DFT vector according to the second CSI.

In some embodiments, the transceiver is further configured to transmit downlink signals containing a second CSI-RS configuration on PDSCH, N-port CSI-RS according to the second CSI-RS configuration, and receive uplink signals from the UE containing the second CSI comprising two nonnegative integers derived from the N-port CSI-RS, and wherein the controller is further configured to determine the precoding vector as a Kronecker product of two oversampled DFT vectors corresponding to the second CSI.

In some embodiments, the NCSI-RS are mapped to a 2-dimensional array of N transceiver units respectively mapped to N antenna subarrays placed on a 2-dimensional antenna panel.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (1) 3rd generation partnership project (3GPP) TS 36.211, "E-UTRA, Physical channels and modulation", Release-12; (2) 3GPP TS 36.212, "E-UTRA, Multiplexing and channel coding", Release-12; and (3) 3GPP TS 36.213, "E-UTRA, Physical layer procedures", Release-12.

Figure 1:
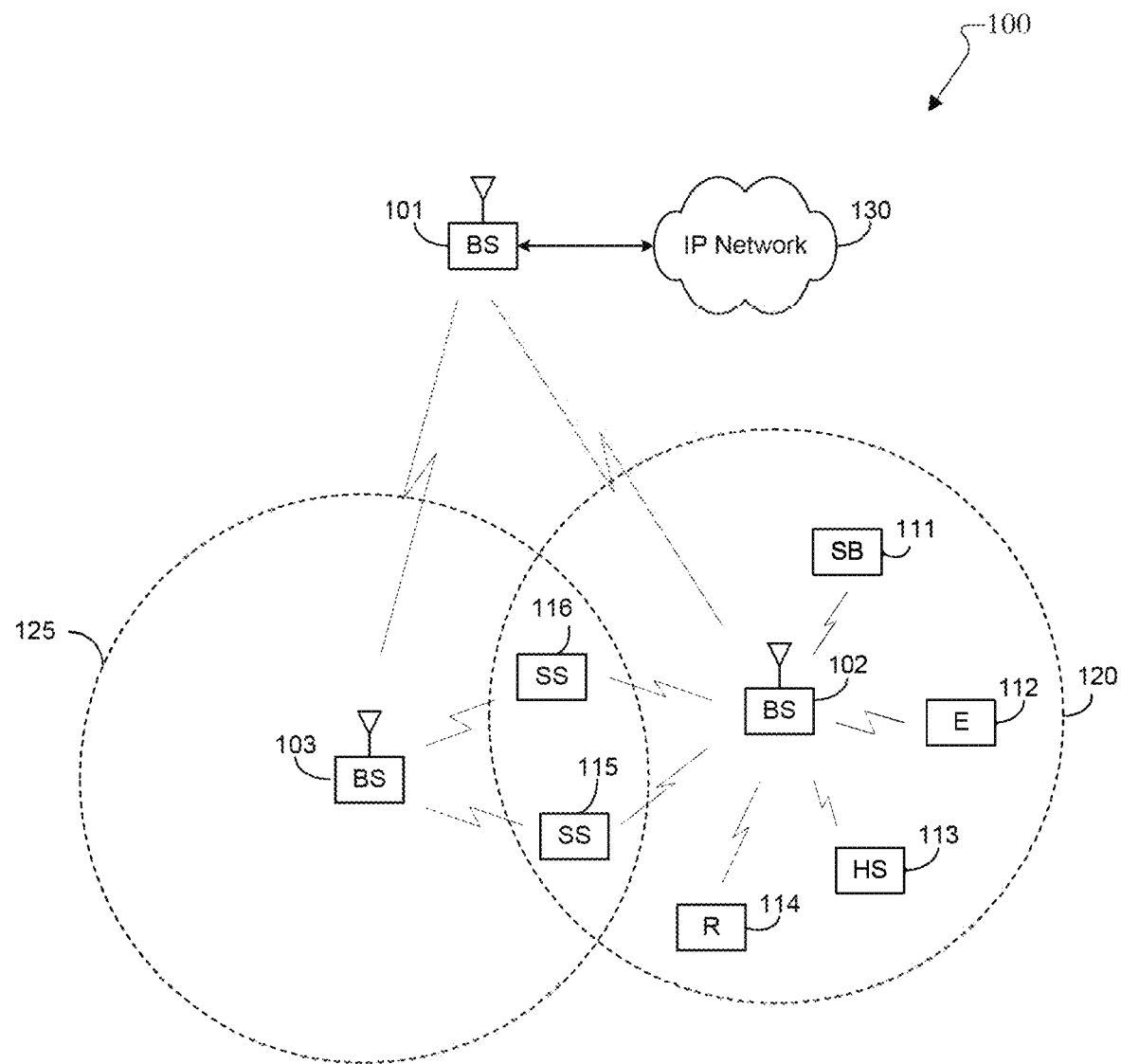
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and manmade obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
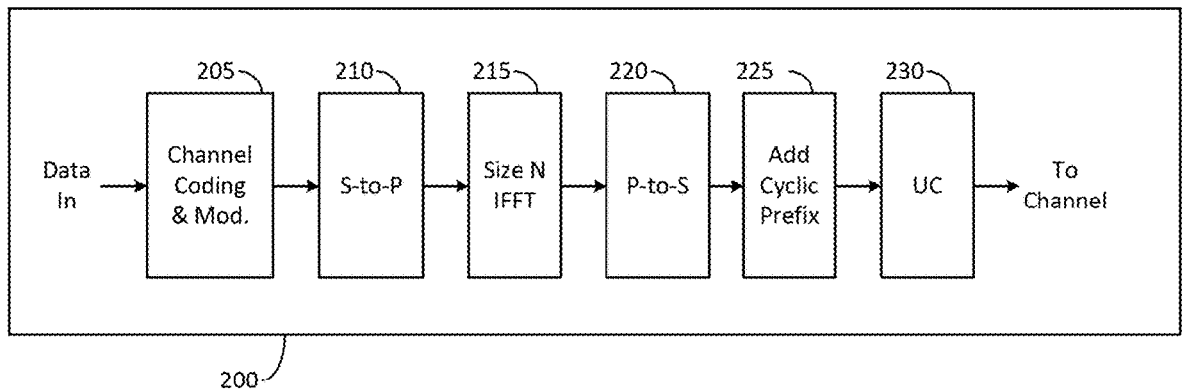
FIGS. 2A and 2B illustrate example wireless transmit and receive paths according to this disclosure.
Figure 2B:
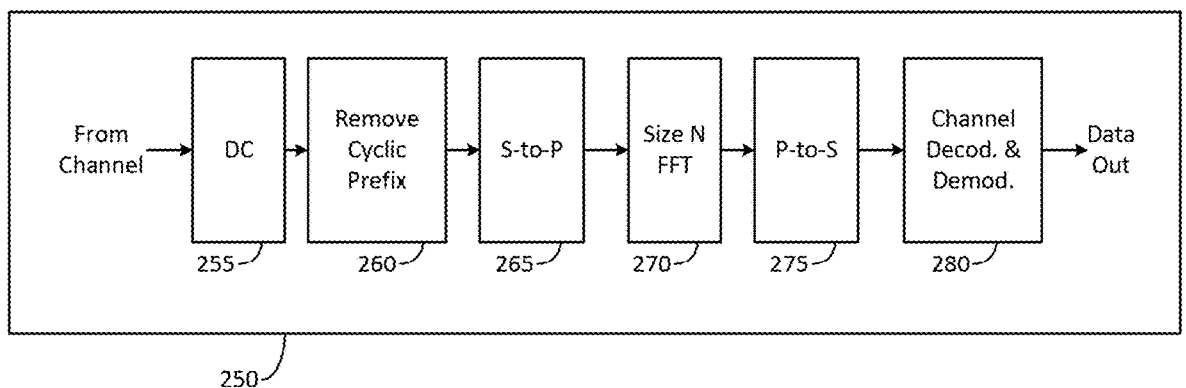

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
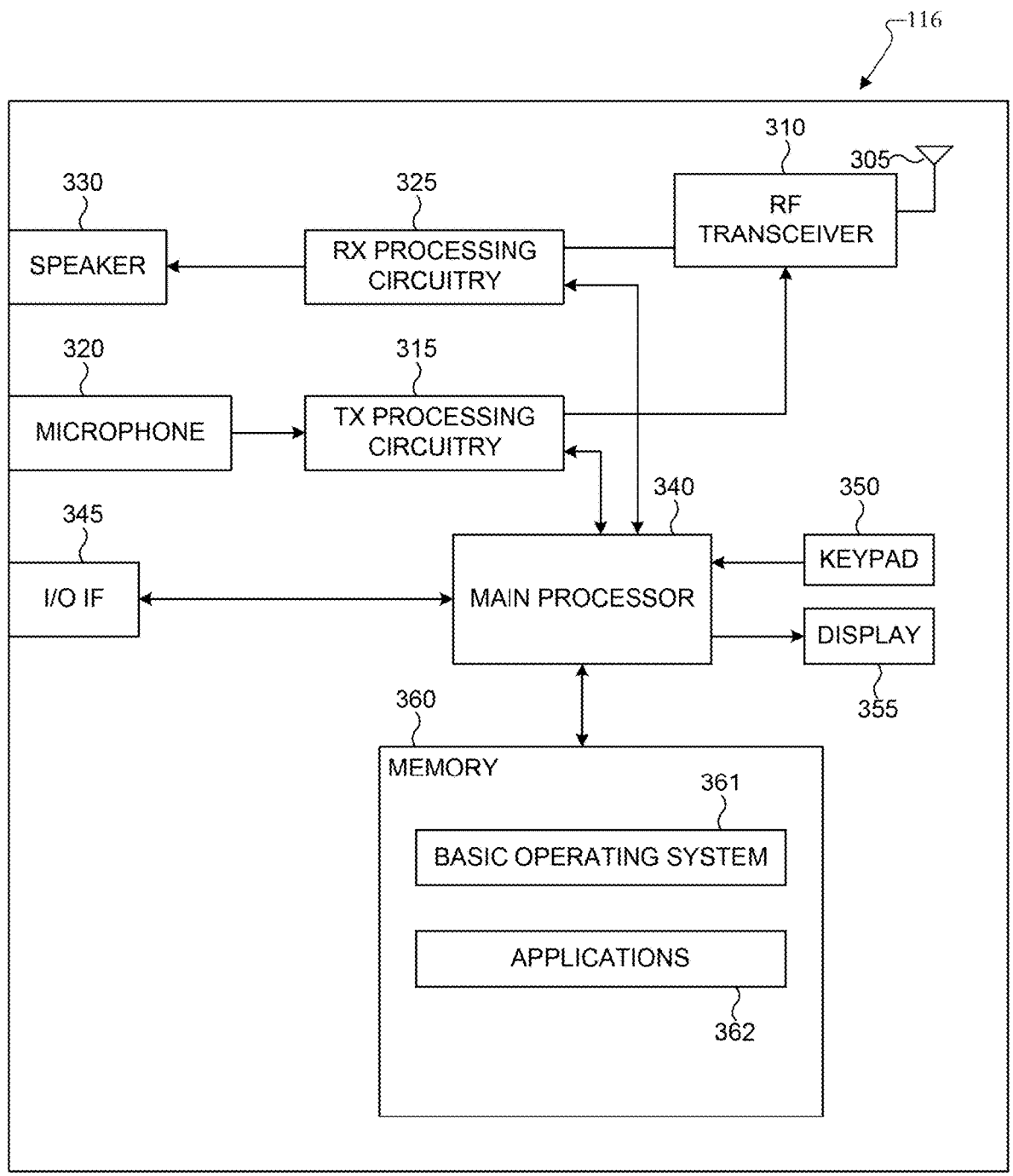
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
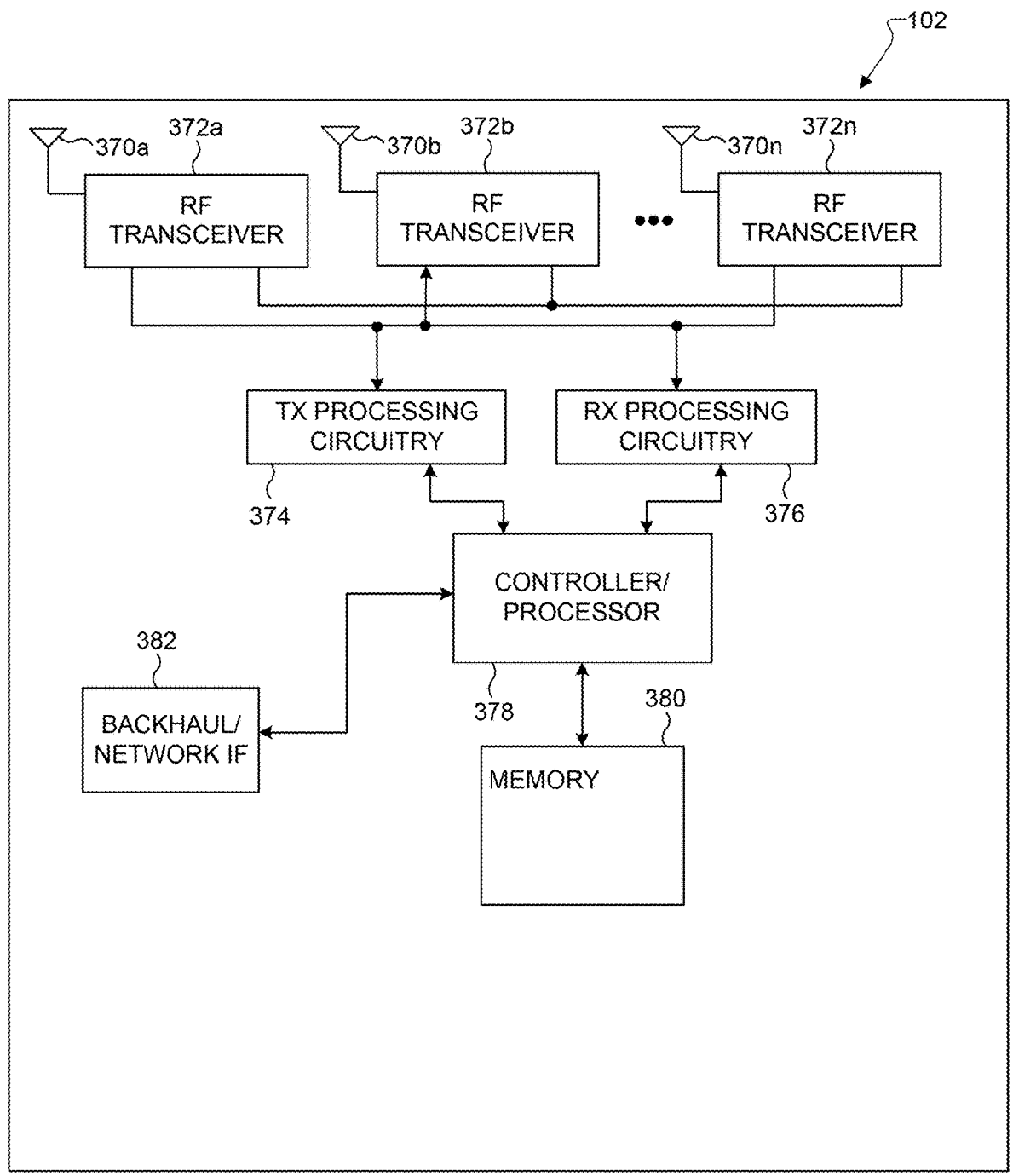
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 324 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 335. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 325. Part of the memory 330 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4A:
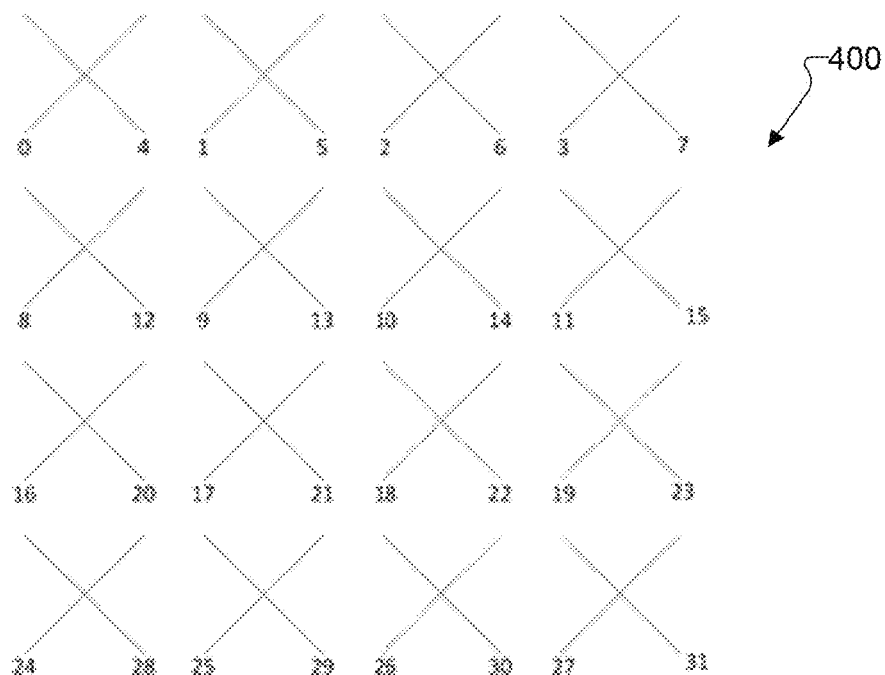
FIGS. 4A and 4B illustrate example 2D antenna arrays comprising 16 dual-polarized antenna elements according to this disclosure.
Figure 4B:
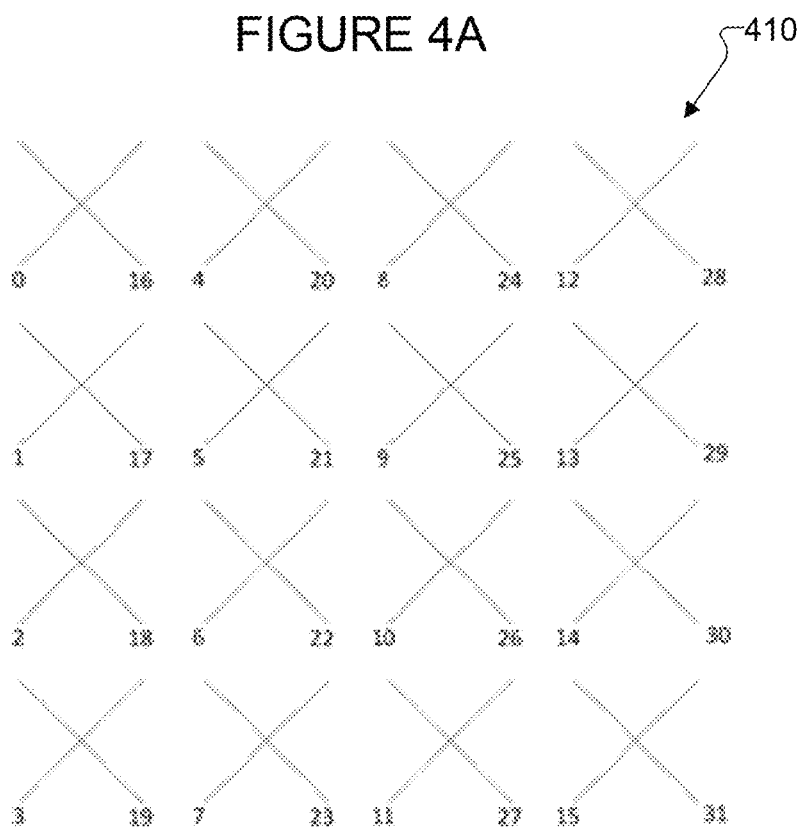

FIGS. 4A and 4B illustrate example 2D antenna arrays that are constructed from 16 dual-polarized antenna elements arranged in a 4×4 rectangular format according to embodiments of the present disclosure. FIG. 4A illustrates a 4×4 dual-polarized antenna array 400 with antenna port (AP) indexing 1, and FIG. 4B is the same 4×4 dual-polarized antenna array 410 with antenna port indexing (AP) indexing 2. The embodiment shown in FIGS. 4A and 4B are for illustration only. Other embodiments could be used without departing from the scope of the present disclosure.

In certain embodiments, each labelled antenna element is logically mapped onto a single antenna port. In general, one antenna port can correspond to multiple antenna elements (physical antennas) combined via a virtualization. This 4×4 dual polarized array can then be viewed as 16×2=32-element array of elements. The vertical dimension (consisting of 4 rows) facilitates elevation beamforming in addition to the azimuthal beamforming across the horizontal dimension (consisting of 4 columns of dual polarized antennas). MIMO precoding in Rel.12 LTE standardization (per TS36.211 sections 6.3.4.2 and 6.3.4.4; and TS36.213 section 7.2.4) was largely designed to offer a precoding gain for one-dimensional antenna array. While fixed beamforming (i.e. antenna virtualization) can be implemented across the elevation dimension, it is unable to reap the potential gain offered by the spatial and frequency selective nature of the channel.

Figure 5:
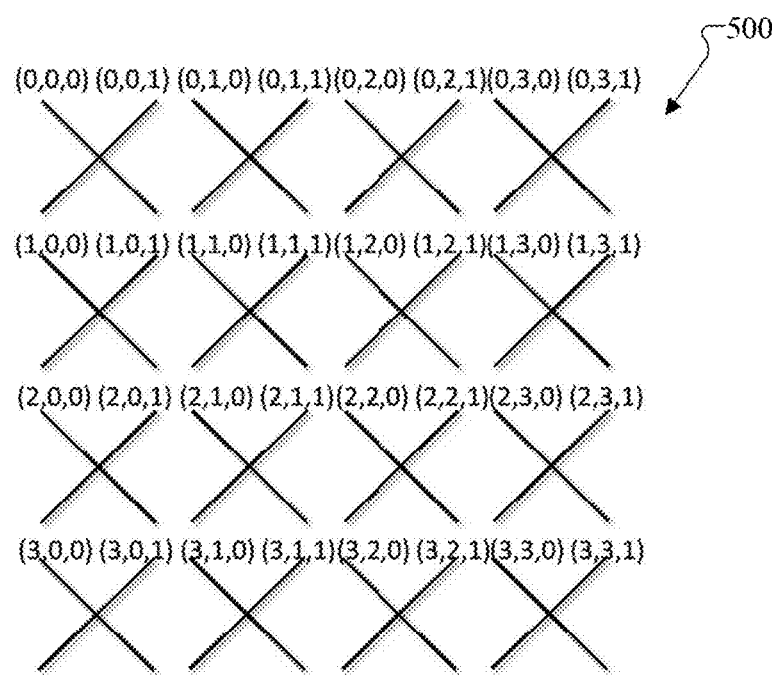
FIG. 5 illustrates another numbering of TX antenna elements according to this disclosure.

FIG. 5 illustrates another numbering of TX antenna elements 500 (or TXRU) according to embodiments of the present disclosure. The embodiment shown in FIG. 5 is for illustration only. Other embodiments could be used without departing from the scope of the present disclosure.

In certain embodiments, eNB 103 is equipped with 2D rectangular antenna array (or TXRUs), comprising M rows and N columns with P=2 polarized, wherein each element (or TXRU) is indexed with (m, n, p), and m=0, ..., M−1, n=0, ..., N−1, p=0, ..., P−1, as illustrated in FIG. 5 with M=N=4. When the example shown in FIG. 5 represents a TXRU array, a TXRU can be associated with multiple antenna elements. In one example (1-dimensional (1D) subarray partition), an antenna array comprising a column with a same polarization of a 2D rectangular array is partitioned into M groups of consecutive elements, and the M groups correspond to the M TXRUs in a column with a same polarization in the TXRU array in FIG. 5.

In conventional LTE, MIMO precoding (for spatial multiplexing) can be performed either with CRS (cf. TS36.211 section 6.3.4.2) or UE-specific reference signal (UE-RS) (cf. TS36.211 section 6.3.4.4). In either case, each UE operating in spatial multiplexing mode(s) is configured to report CSI that can contain precoding matrix indicator (PMI) (i.e. precoding codebook index). PMI report is derived from one of the following sets of standardized codebooks: Two antenna ports: {TS36.211 table 6.3.4.2.3-1}; Four antenna ports: {TS36.211 table 6.3.4.2.3-2} or {TS36.213 table 7.2.4-0A, B, C, and D}; and Eight antenna ports: {TS36.213 table 7.2.4-1, 2, 3, 4, 5, 6, 7, and 8}

If the eNB 103 follows a PMI recommendation by UE 115, the eNB 103 is expected to precode its transmitted signal according to the recommended precoding vector/matrix (for a given subframe and physical resource block (PRB)). Regardless whether the eNB 108 follows the recommendation by UE 115, the UE 115 is configured to report a PMI according to the above precoding codebooks. Here a PMI (which can consist of a single index or a pair of indices) is associated with a precoding matrix W of size $N_c \times N_L$ where $N_c$ is the number of antenna ports in one row (=number of columns) and $N_L$ is the number of transmission layers.

Rel. 12 LTE 8-Tx Double Codebook

TABLE 1 and TABLE 2 are codebooks for rank-1 and rank-2 (1-layer and 2-layer) CSI reporting for UEs configured with 8 Tx antenna port transmissions. To determine a CW for each codebook, two indices, i.e., $i_1$ and $i_2$ have to be selected. In these precoder expressions, the following two variables are used:

$$\varphi_n = e^{j\pi n/2}$$

$$v_m = [1\ e^{j2\pi m/32}\ e^{j4\pi m/32}\ e^{j6\pi m/32}]^T.$$

TABLE 1

Codebook for 1-layer CSI reporting using antenna ports 15 to 22

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \dfrac{1}{\sqrt{8}} \begin{bmatrix} v_m \\ \varphi_n v_m \end{bmatrix}$, If the most recently reported RI=1, m and n are derived with the two indices $i_1$ and $i_2$ according to TABLE 1, resulting in a rank-1 precoder, $$W_{m,n}^{(1)} = \frac{1}{\sqrt{8}} \begin{bmatrix} v_m \\ \varphi_n v_m \end{bmatrix}.$$

TABLE 2

Codebook for 2-layer CSI reporting using antenna ports 15 to 22.

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1,0}^{(2)}$ | $W_{2i_1+1,2i_1+1,1}^{(2)}$ |

| $i_1$ | $i_2$ | | | |
|---|---|---|---|---|
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

TABLE 2-continued

Codebook for 2-layer CSI reporting using antenna ports 15 to 22.

| $i_1$ | $i_2$ | | | |
|---|---|---|---|---|
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \dfrac{1}{4} \begin{bmatrix} v_m & v_{m'} \\ \varphi_n v_m & -\varphi_n v_{m'} \end{bmatrix}$ If the most recently reported RI=2, m, m' and n are derived with the two indices $i_1$ and $i_2$ according to TABLE 2, resulting in a rank-2 precoder, $$W_{m,m',n}^{(2)} = \frac{1}{4} \begin{bmatrix} v_m & v_{m'} \\ \varphi_n v_m & -\varphi_n v_{m'} \end{bmatrix}.$$

It is noted that $W_{m,m',n}^{(2)}$ is constructed such that it can be used for two different types of channel conditions that facilitate a rank-2 transmission.

One subset of the codebook associated with $i_2=\{0, 1, \ldots, 7\}$ comprises codewords with m=m', or the same beams ($v_m$) are used for constructing the rank-2 precoder:

$$W_{m,m,n}^{(2)} = \frac{1}{4} \begin{bmatrix} v_m & v_m \\ \varphi_n v_m & -\varphi_n v_m \end{bmatrix}.$$

In this case, the two columns in the 2-layer precoder are orthogonal (i.e., $[v_m \varphi_n v_m]^H \cdot [v_m\ -\varphi_n v_m] = 0$), owing to the different signs applied to $\varphi_n$ for the two columns. These rank-2 precoders are likely to be used for those UEs that can receive strong signals along two orthogonal channels generated by the two differently polarized antennas.

Rel. 12 LTE Alternative 4-Tx Double Codebook

Based on a similar concept to that of 8-Tx, the alternative 4-Tx codebook can be written as follows:

$$\varphi_n = e^{j\pi n/2}$$
$$\varphi'_n = e^{j 2\pi n/32}$$
$$v'_m = [1 \; e^{j 2\pi n/32}]^T \quad (1)$$

TABLE 3

Codebook for 1-layer CSI reporting using antenna ports 0 to 3 or 15 to 18

| $i_1$ | | | | $i_2$ | | | | |
|---|---|---|---|---|---|---|---|---|
| | 0 | 1 | 2 | 3 | 4 | 5 | 6 | 7 |
| 0-15 | $W_{i_1,0}^{(1)}$ | $W_{i_1,8}^{(1)}$ | $W_{i_1,16}^{(1)}$ | $W_{i_1,24}^{(1)}$ | $W_{i_1+8,2}^{(1)}$ | $W_{i_1+8,10}^{(1)}$ | $W_{i_1+8,18}^{(1)}$ | $W_{i_1+8,26}^{(1)}$ |

| $i_1$ | | | | $i_2$ | | | | |
|---|---|---|---|---|---|---|---|---|
| | 8 | 9 | 10 | 11 | 12 | 13 | 14 | 15 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ | $W_{i_1+24,6}^{(1)}$ | $W_{i_1+24,14}^{(1)}$ | $W_{i_1+24,22}^{(1)}$ | $W_{i_1+24,30}^{(1)}$ | where $W_{m,n}^{(1)} = \frac{1}{2}\begin{bmatrix} v'_m \\ \varphi'_n v'_m \end{bmatrix}$

TABLE 4

Codebook for 2-layer CSI reporting using antenna ports 0 to 3 or 15 to 18

| $i_1$ | | $i_2$ | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | | $i_2$ | | |
|---|---|---|---|---|
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | | $i_2$ | | |
|---|---|---|---|---|
| | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| $i_1$ | | $i_2$ | | |
|---|---|---|---|---|
| | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ | where $W_{m,m',n}^{(2)} = \frac{1}{\sqrt{8}}\begin{bmatrix} v'_m & v'_{m'} \\ \varphi_n v'_m & -\varphi_n v'_{m'} \end{bmatrix}$ Rel. 8 LTE 2-Tx Codebook For transmission on two antenna ports, $p \in \{0.1\}$, and for the purpose of CSI reporting based on two antenna ports $p \in \{0.1\}$ or $p \in \{15,16\}$, the precoding matrix W(i) shall be selected from TABLE 5 or a subset thereof. For the closed-loop spatial multiplexing transmission mode, the codebook index 0 is not used when the number of layers is υ=2.

TABLE 5

Codebook for transmission on antenna ports {0,1} and for CSI reporting based on antenna ports {0,1} or {15,16}.

| Codebook index | Number of layers υ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

For FD-MIMO that utilizes 2D antenna array (hence 2D precoding), the need for high-performance, scalable (with respect to the number and geometry of transmit antennas), and flexible CSI feedback framework and structure is necessary. One approach is that eNB 103 transmits a number of precoded CSI-RS. In one such example, each CSI-RS port covers a certain angle range of the severing area, rather than the entire serving area. The precoders for the CSI-RS can be determined by, for example, estimating uplink channels with uplink signals. The benefits of the precoded CSI-RS transmission are: (1) allowing eNB to deliver CSI-RS power effectively to UEs and reduce CSI-RS transmission needed and (2) allowing UEs to reduce CSI-RS feedback by selecting a subset of CSI-RS ports to feedback.

The eNB operation according to some embodiments of the present disclosure is as follows:

1. eNB determines precoders (or angle directions) for $N_P$ CSI-RS ports, based upon uplink sounding reference signals (SRS), PUSCH/PUCCH or history of PMI feedback or a combination of the aforementioned.

2. CSI-RS virtualization examples:

2.1 $N_P$ ports are partitioned into two groups, CSI-RS of an antenna port belonging to a first group is transmitted from a first group of antennas with a first polarization of p=0; CSI-RS of an antenna port belonging to a second group is transmitted from a second group of antennas with a second polarization with a first polarization of p=1. In one example, when $N_P$ is even, CSI-RS on port 0, . . . , $N_P/2-1$ are transmitted on a first group of antennas {(m,n,p=0), m=0, . . . , M−1, n=0, . . . , N−1}, with +45° polarization, while CSI-RS on port $N_P/2$, . . . , $N_P-1$ are transmitted on a second group of antennas {(m,n,p=1), m=0, . . . , M−1, n=0, . . . , N−1}, with −45° polarization.

2.2 $N_P$ antenna ports are partitioned into $N_P/2$ pairs of antenna ports. Both antenna ports of each pair are mapped onto the same set of antenna element locations with the same precoding or beamforming (i.e., both are mapped onto a same set of {(m,n)} and a same precoding is applied on the set of antennas with the same polarization), but they are on the antennas with different polarization, i.e., a first port is mapped onto p=0 and a second port is mapped onto p=1.

2.2.1 In one example, a first CSI-RS of a first pair of CSI-RS ports is transmitted on a first group of antennas (or TXRUs) {(m,n,p=0), m=0, . . . M−1, n=0, . . . , N−1}, with +45° polarization wherein a first antenna virtualization precoder $w^{(1)}$ is applied on the group of antennas; and a second CSI-RS of the pair of CSI-RS is transmitted on a second group of antennas (or TXRUs) {(m,n,p=1), m=0, . . . , M−1, n=0, . . . , N−1}, with −45° polarization, wherein the same antenna virtualization precoder $w^{(1)}$ is applied on the group of antennas. When M=8 and N=2, for example, the virtualization mapping on the MN elements with a first polarization for the first CSI-RS (denoted as $s_{a=0}$) and the mapping for the second CSI-RS (denoted as $s_{a=1}$) would respectively be:

$$\begin{bmatrix} x_{(m=0,n=0,p=0)} \\ \vdots \\ x_{(m=7,n=0,p=0)} \\ x_{(m=0,n=1,p=0)} \\ \vdots \\ x_{(m=7,n=1,p=0)} \end{bmatrix} = \begin{bmatrix} w^{(1)}_{(m=0,n=0)} \\ \vdots \\ w^{(1)}_{(m=7,n=0)} \\ w^{(1)}_{(m=0,n=1)} \\ \vdots \\ w^{(1)}_{(m=7,n=1)} \end{bmatrix} s_{a=0}; \text{ and} \quad (2)$$

$$\begin{bmatrix} x_{(m=0,n=0,p=1)} \\ \vdots \\ x_{(m=7,n=0,p=1)} \\ x_{(m=0,n=1,p=1)} \\ \vdots \\ x_{(m=7,n=1,p=1)} \end{bmatrix} = \begin{bmatrix} w^{(1)}_{(m=0,n=0)} \\ \vdots \\ w^{(1)}_{(m=7,n=0)} \\ w^{(1)}_{(m=0,n=1)} \\ \vdots \\ w^{(1)}_{(m=7,n=1)} \end{bmatrix} s_{a=1}$$

wherein $x_{(m,n,p)}$ is a signal mapped on element (m, n, p), and $$w^{(1)} = \begin{bmatrix} w^{(1)}_{(m=0,n=0)} \\ \vdots \\ w^{(1)}_{(m=7,n=0)} \\ w^{(1)}_{(m=0,n=1)} \\ \vdots \\ w^{(1)}_{(m=7,n=1)} \end{bmatrix}.$$

3. $N_P$ can be decomposed into $N_P=N_H \cdot N_V$, wherein $N_H$ is a number of antenna ports in a row; and $N_V$ is a number of antenna ports in column of 2D rectangular antenna array. In one example, $N_V=4$ and $N_H=8$, wherein the x-pol dimension is counted towards a row rather than towards a column.

The UE 115 operation according to some embodiments of the present disclosure is as follows:

1. UE 115 receives CSI-RS configuration for $N_P$ antenna ports and corresponding CSI-RS.

2. UE 115 selects Q ($\leq N_P$) number of CSI-RS ports out of $N_P$ antenna ports, e.g., based upon the received power on these ports. In case Q=$N_P$, the UE 115 selects all the configured number of CSI-RS ports for CSI derivation.

2.1 In one method, UE 115 is configured to select q=Q/2 number of pairs of CSI-RS ports for each of which a same precoding w is applied but with different polarization, or in other words, q beams. Hence, each beam corresponds to a pair of CSI-RS ports.

2.1.1 In one example, CSI-RS ports are numbered in such a way that the pair of CSI-RS ports are CSI-RS port a and CSI-RS port a+A.

2.1.2 In another example, CSI-RS ports are numbered in such a way that the pair of CSI-RS ports are CSI-RS port 2a and CSI-RS port 2a+1.

2.1.3 In another example, two CSI processes are configured for a UE 115, wherein a first CSI process is for those CSI-RS ports associated with a first polarization (i.e., p=0) and a second CSI process is for those CSI-RS ports associated with a second polarization (i.e., p=1).

In these examples, the UE 115 is supposed to select the two CSI-RS ports as a pair, and is not allowed to select only one CSI-RS port of a pair.

3. Upon selecting q pairs of CSI-RS ports (or q beams), the UE 115 is configured to derive co-phasing factors for each pair of ports.

3.1 In one method, the UE 115 derives q co-phasing factors for the two ports of every pair.

3.2 In another method, the UE 115 derives one common co-phasing factor between the two ports of all the pairs.

4. Conditioned on the Q selected port(s) and q co-phasing factors, the UE 115 derives CQI, PMI, and/or RI.

4.1 In one example, when Q=2 (q=1) ports are selected, the UE 115 performs a hypothesis testing on whether rank 1 or rank 2 support higher transmission rate. For the rank-1 hypothesis, the UE 115 assumes that the received signals from the two ports carry one stream of information and are combined at the receiver; for the rank-2 hypothesis the UE 115 assumes that the received signals from the two ports carry two streams of information and applies MIMO receiver.

4.1.1 Signal on CSI-RS antenna ports a is denoted as $y_a$. Then, with rank-1 hypothesis the UE assumes that the received signal is according to the following equation:

$$\begin{bmatrix} y_0 \\ y_1 \end{bmatrix} = \frac{1}{\sqrt{2}} \begin{bmatrix} 1 \\ \varphi_n \end{bmatrix} x, \quad (3)$$

where x is a signal on DMRS port, $$\begin{bmatrix} 1 \\ \varphi_n \end{bmatrix}$$

will correspond to a precoder indicated by feedback PMI. With rank-2 hypothesis the UE assumes:

$$\begin{bmatrix} y_0 \\ y_1 \end{bmatrix} = \frac{1}{2} \begin{bmatrix} 1 & 1 \\ \varphi_n & -\varphi_n \end{bmatrix} \begin{bmatrix} x_1 \\ x_2 \end{bmatrix}, \quad (4)$$

where $x_1$, $x_2$ are signals on two DMRS ports (ports 7 and 8). Here, $\varphi_n$ is a co-phasing factor which will comprise the feedback PMI. In one example, $\varphi_n$ for rank 1 is selected from $$\left\{ \exp\left(-j\frac{2\pi k}{4}\right), k = 0, 1, 2, 3 \right\}$$

and $\varphi_n$ for rank 2 is selected from $$\left\{ \exp\left(-j\frac{4\pi k}{4}\right), k = 0, 1 \right\}.$$

4.2 In another example, when Q=2 (q=1) ports are selected, the UE uses Rel-8 2-Tx codebook (TABLE 5) to report PMI/CQI/RI.

4.3 In another example, 8 CSI-RS ports are configured for the UE 115. A UE 115 receives a set of 8 port precoded CSI-RS from eNB 103, wherein the 8 port CSI-RS is partitioned into two groups, one group with a first polarization (p=0) and the other group with a second polarization (p=1). A UE 115 is further configured with a set of four precoding vectors $u_0,u_1,u_2,u_3$, each of size 4×1, to be applied on each group of four CSI-RS ports. The four vectors $u_0,u_1,u_2,u_3$, can be either configured by eNB 103 or can be hard-coded. Suppose that the received signals on the 8 port CSI-RS is represented by $[y_0, y_1, y_2, y_3, y_5, y_6, y_7,]$, wherein $y_0, y_1, y_2, y_3$ are with p=0 and $y_4, y_5, y_6, y_7$ are with p=1. In addition, CSI-RS port a is paired with CSI-RS port a+4, a=0, 1, 2, 3, wherein the pair ports are precoded with the same precoder on same set of (m,n) but on different p. When the legacy LTE antenna port numbering scheme for CSI-RS is applied, a=15, 16, 17, 18. Then, for deriving rank-1 CQI/PMI, the UE assumes the following signal model with assuming a rank-1 precoder W has been applied:

$$\begin{bmatrix} y_0 \\ y_1 \\ y_2 \\ y_3 \\ y_4 \\ y_5 \\ y_6 \\ y_7 \end{bmatrix} = Wx = \begin{bmatrix} \begin{bmatrix} u_{00} & u_{10} & u_{20} & u_{20} \\ u_{01} & u_{11} & u_{21} & u_{21} \\ u_{02} & u_{12} & u_{22} & u_{22} \\ u_{03} & u_{13} & u_{23} & u_{23} \end{bmatrix} & 0 \\ 0 & \begin{bmatrix} u_{00} & u_{10} & u_{20} & u_{20} \\ u_{01} & u_{11} & u_{21} & u_{21} \\ u_{02} & u_{12} & u_{22} & u_{22} \\ u_{03} & u_{13} & u_{23} & u_{23} \end{bmatrix} \end{bmatrix} \begin{bmatrix} \begin{bmatrix} \alpha_0 c_0 \\ \alpha_1 c_1 \\ \alpha_2 c_2 \\ \alpha_3 c_3 \end{bmatrix} \\ \begin{bmatrix} \alpha_4 c_0 \\ \alpha_5 c_1 \\ \alpha_6 c_2 \\ \alpha_7 c_3 \end{bmatrix} \end{bmatrix} x; \quad (5)$$

wherein $[\alpha_0,\alpha_1,\alpha_2,\alpha_3,\alpha_4,\alpha_5,\alpha_6,\alpha_7]$ is a vector of unit-norm complex numbers in a form of $\exp(-j\theta)$. When the UE 115 selects q precoding vectors out of these four precoding vectors, the UE 115 should feedback 2q non-zero complex numbers, wherein the first complex number (e.g., $\alpha_i$ with smallest index) is hard-coded to be 1. In this case, the PMI comprises information on $$\begin{bmatrix} c_0 \\ c_1 \\ c_2 \\ c_3 \end{bmatrix}$$

and $[\alpha_0,\alpha_1,\alpha_2,\alpha_3,\alpha_4,\alpha_5,\alpha_6,\alpha_7]$.

4.3.1. In one example, $$[u_0, u_1, u_2, u_3] = \begin{bmatrix} u_{00} & u_{10} & u_{20} & u_{20} \\ u_{01} & u_{11} & u_{21} & u_{21} \\ u_{02} & u_{12} & u_{22} & u_{22} \\ u_{03} & u_{13} & u_{23} & u_{23} \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

and hard-coded. With the choice of q precoding vectors (beams), Q=2q CSI-RS ports are selected.

The precoder W here can be represented by $W=W_1 W_2$, wherein $$W_2 = \begin{bmatrix} \begin{bmatrix} \alpha_0 c_0 \\ \alpha_1 c_1 \\ \alpha_2 c_2 \\ \alpha_3 c_3 \end{bmatrix} \\ \begin{bmatrix} \alpha_4 c_0 \\ \alpha_5 c_1 \\ \alpha_6 c_2 \\ \alpha_7 c_3 \end{bmatrix} \end{bmatrix} \text{ and } W_1 = \begin{bmatrix} \begin{bmatrix} u_{00} & u_{10} & u_{20} & u_{20} \\ u_{01} & u_{11} & u_{21} & u_{21} \\ u_{02} & u_{12} & u_{22} & u_{22} \\ u_{03} & u_{13} & u_{23} & u_{23} \end{bmatrix} & 0 \\ 0 & \begin{bmatrix} u_{00} & u_{10} & u_{20} & u_{20} \\ u_{01} & u_{11} & u_{21} & u_{21} \\ u_{02} & u_{12} & u_{22} & u_{22} \\ u_{03} & u_{13} & u_{23} & u_{23} \end{bmatrix} \end{bmatrix};$$

and it can be seen that $W_2$ comprises two pieces of information: (1) column (or pair or beam) selection $[c_0,c_1,c_2,c_3]$ and phase coefficients for the selected columns.

4.3.2. For example, if $[c_0,c_1,c_2,c_3]=[1\ 1\ 0\ 0]$, four phase coefficients for the selected columns need to be quantized and feedback together with the column selection information: $\alpha_0,\alpha_1,\alpha_4,\alpha_5$, wherein $\alpha_0=1$. The PMI in this case corresponds to $[c_0,c_1,c_2,c_3]=[1\ 1\ 0\ 0]$ and $[\alpha_0=1,\alpha_1,\alpha_4,\alpha_5]$.

4.3.3. In another example, $W_1=I$ and only one column (beam) is selected. As there are 4 cases of selecting one column out of 4 columns, a 2-bit is needed to code this information as shown in TABLE 6 below. For example, if $[c_0,c_1,c_2,c_3]=[1\ 0\ 0\ 0]$ is selected, only one phase coefficient, $\alpha_1$, needs to be quantized with $[\alpha_0=1,\alpha_4]$. The term $\alpha_4$ can be quantized as $\exp(j\theta_m)$, where $$\theta_m = \frac{2\pi m}{M},$$

m=0, 1, . . . , M−1, and some example values of M are: M=2,4,8,16. The combined information of column (beam) selection and co-phase can be jointly fed back.

TABLE 6

| Column (beam) selection and co-phase field state (s) | A selected column (beam) | Co-phase (with M = 4) |
|---|---|---|
| 0-3 | 1 | m = s |
| 4-7 | 2 | m = s − 4 |

TABLE 6-continued

| Column (beam) selection and co-phase field state (s) | A selected column (beam) | Co-phase (with M = 4) |
|---|---|---|
| 8-11 | 3 | m = s − 8 |
| 12-15 | 4 | m = s − 12 |

The simple combination of the section 4.3.1 and the section 4.3.3. results in $$W_2 = \begin{bmatrix} 1 \\ 0 \\ 0 \\ 0 \\ \exp\left(j\frac{2\pi m}{4}\right) \\ 0 \\ 0 \\ 0 \end{bmatrix}$$

when $[c_0, c_1, c_2, c_3] = [1\ 0\ 0\ 0]$ and $\alpha_4$ is quantized as $$\exp\left(j\frac{2\pi m}{4}\right),$$

where M=4.

5. The UE 115 is configured to report an index (or indices) of selected pair(s) of CSI-RS ports, (or alternatively a beam index or beam indices), as well as PMI/CQI/RI. In a special case where a UE selects only one index, the UE 115 reports 2-Tx PMI/CQI/RI and the selected beam index.

Embodiment: (CSI Reporting Details with Beam Selection)

In one embodiment, a UE 115 is configured with a CSI-RS resource comprising Q=8 CSI-RS ports, and the UE 115 is further configured to select a pair of CSI-RS ports, and report a CSI-RS port pair index (or a beam index, BI) and corresponding CQI/PMI/RI on the selected CSI-RS ports.

Alternative mapping methods of beam index to a pair of CSI-RS ports are considered as shown in TABLE 7 below, with assuming Q=8 (and also a general Q which can be 4, for example):

TABLE 7

| Beam index (BI) - 2 bits (in general $\log_2(Q/2)$ bits) | | Selected CSI-RS port indices |
|---|---|---|
| $a \in \{0, 1, 2, 3\}$ (in general $a \in \{0, \ldots, Q/2 - 1\}$) | Alt 1 (assuming antenna ports are numbered according to polarization first, ULA second) | (2a + 15, 2a + 16) |
| | Alt 2 (assuming antenna ports are numbered according to ULA first, polarization second) | (a + 15, a + 19) (in general (a + 15, ..., a + 15 + Q/2) |

For PUCCH periodic reporting, a few alternative methods can be considered on how to multiplex beam index (BI), PMI/CQI and RI reports.

In one alternative, BI is reported on the same subframe where PMI/CQI is reported. This alternative can provide better throughput performance when BI changes fast over time.

In another alternative, BI is reported on the same subframe where RI is reported. This alternative can provide more reliable BI transmissions, without changing CSI reporting architecture.

In yet other alternative, BI is reported on a separate subframe from those subframes where PMI/CQI and RI are reported. This alternative ensures best reliable BI reception among all the alternatives considered in this disclosure, but it may have to consume additional resource or may have to increase reporting delay for PM/CQI/RI.

For PUSCH aperiodic reporting, a few alternative methods can be considered on how to multiplex beam index (BI), PMI/CQI and RI reports.

In one alternative, BI is jointly encoded with PMI/CQI, and reported in the PMI/CQI region of the PUSCH. This alternative supports sub-band choice of BI as well as wide-band choice of BI.

In another alternative, BI is jointly encoded with RI and mapped on the RI region of the PUSCH. This alternative ensures more reliable transmission of BI, but its limitation is that BI choice is wideband.

Embodiment: Polarized CSI-RS Transmission

Figure 6:
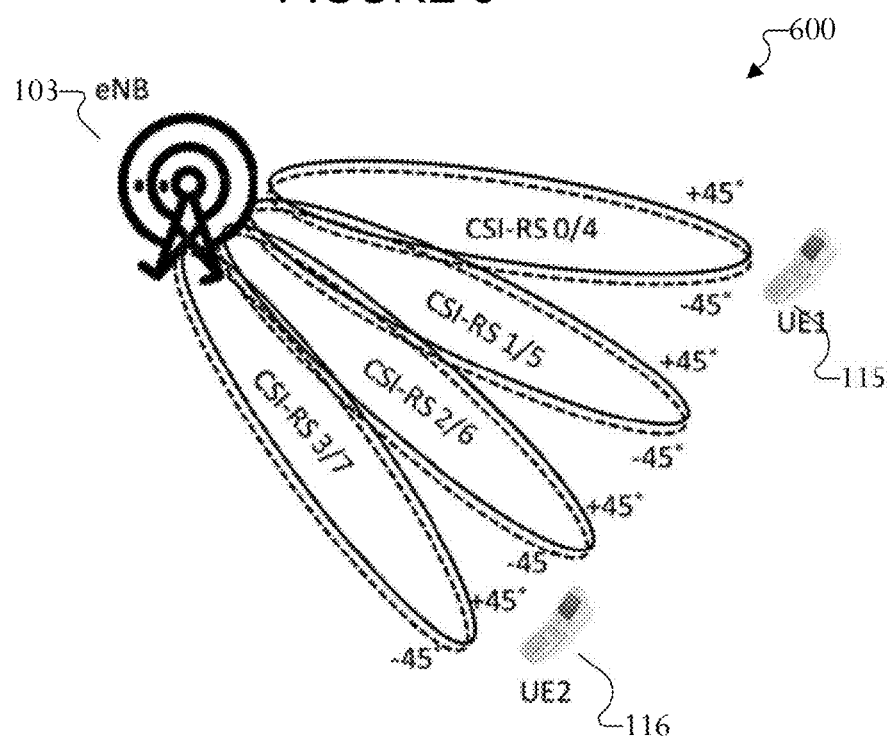
FIG. 6 illustrates the polarized CSI-RS transmission according to this disclosure.

FIG. 6 illustrates the polarized CSI-RS transmission 600 according to embodiments of the present disclosure. The embodiment shown in FIG. 6 is for illustration only. Other embodiments could be used without departing from the scope of the present disclosure.

In this embodiment, a pair of CSI-RS ports are precoded with a same weight vector and transmitted via a same set of columns and rows of antennas, where one CSI-RS is sent via the antennas in the set with +45° polarization and the other CSI-RS is sent via the antennas in the set with −45°, as shown in FIG. 6.

Embodiment: Sequential Polarized CSI-RS Transmission

Figure 7A:
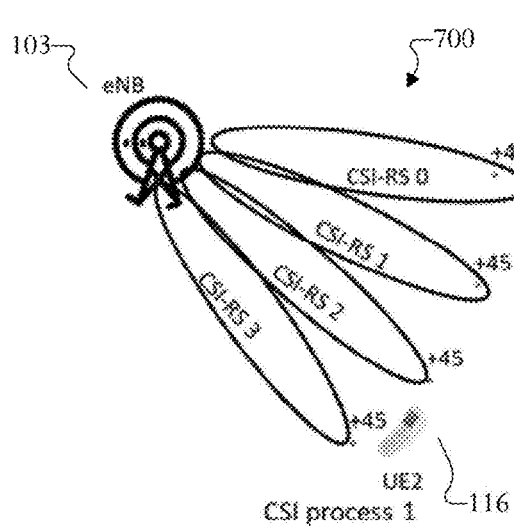
FIGS. 7A and 7B illustrates the sequential polarized CSI-RS transmissions 700 according to this disclosure.
Figure 7B:
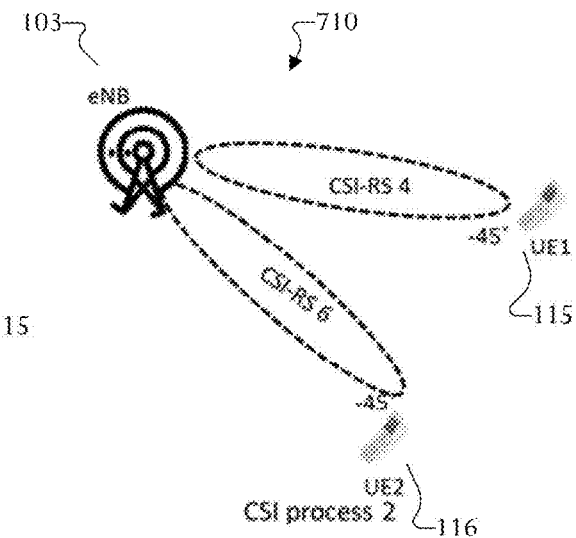

FIGS. 7A and 7B illustrates the sequential polarized CSI-RS transmissions 700, 710 according to embodiments of the present disclosure. The embodiment shown in FIG. 7 is for illustration only. Other embodiments could be used without departing from the scope of the present disclosure.

In this embodiment, CSI-RS may not be transmitted in pair of polarization. In one CSI process, CSI-RS can be transmitted from +45°, and in another CSI process, CSI-RS can be transmitted from −45°. During the two processes, the number of CSI-RS ports transmitted is not necessarily identical. The motivation is to reduce CSI-RS resource as well as reduce feedback load for cases polarization diversity is not needed much. The concept of the embodiment is shown in FIGS. 7A and 7B.

Embodiment: Flexible Polarized CSI-RS Transmission

Figure 8:
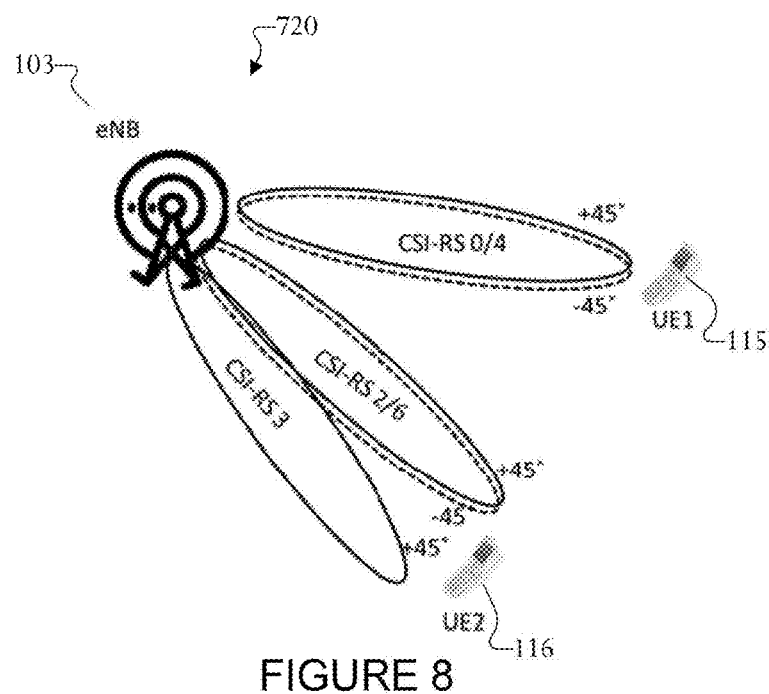
FIG. 8 illustrates the flexible polarized CSI-RS transmission according to this disclosure.

FIG. 8 illustrates the flexible polarized CSI-RS transmission according to embodiments of the present disclosure. The embodiment shown in FIG. 8 is for illustration only. Other embodiments could be used without departing from the scope of the present disclosure.

In certain embodiments, CSI-RS may not be transmitted in pair of polarization, as shown in FIG. 8. The eNB 103 signals the polarization associated with each of the ports, or the polarization of the ports are implicitly associated with the port number. The motivation is again to reduce CSI-RS resource as well as reduce feedback load for cases polarization diversity is not needed much. The eNB 103 can decide CSI-RS to transmit based on uplink measurement or history of CSI feedback.

Embodiment: UE Partial-PMI Feedback

A UE 115 is configured to receive 8 port precoded CSI-RS from eNB 103, wherein the 8 port CSI-RS is partitioned into two groups, one group with a first polarization (p=0) and the other group with a second polarization (p=1). A UE 115 is further configured with a set of four precoding vectors $u_0, u_1, u_2, u_3$, each of size 4×1, to be applied on each group of four CSI-RS ports. The four vectors $u_0, u_1, u_2, u_3$ can be either configured by eNB 103 or can be hard-coded.

Suppose that the received signals on the 8 port CSI-RS is represented by $[y_0, y_1, y_2, y_3, y_4, y_5, y_6, y_7]$, wherein $y_0, y_1, y_2, y_3$ are with p=0 and $y_4, y_5, y_6, y_7$ are with p=1. In addition, CSI-RS port a is paired with CSI-RS port a+4, a=0, 1, 2, 3, wherein the pair ports are precoded with the same precoder on same set of (m,n) but on different p. When the UE 115 derives a rank-1 CQI with $u_0 = [u_{00}, u_{01}, u_{02}, u_{03}]^t$ on these 8 CSI-RS ports, the UE 115 should assume the following signal model for CSI (CQI,PMI,RI) derivation:

$$\begin{bmatrix} y_0 \\ y_1 \\ y_2 \\ y_3 \\ y_4 \\ y_5 \\ y_6 \\ y_7 \end{bmatrix} = \begin{bmatrix} u_{00} & & \\ u_{01} & & 0 \\ u_{02} & & \\ u_{03} & & \\ & u_{00} & \\ 0 & u_{01} & \\ & u_{02} & \\ & u_{03} & \end{bmatrix} \begin{bmatrix} 1 \\ \varphi_n \end{bmatrix} x \quad (6)$$

Extending this approach, all of precoding vectors $u_0, u_1, u_2, u_3$ can be jointly considered in a single equation:

$$\begin{bmatrix} y_0 \\ y_1 \\ y_2 \\ y_3 \\ y_4 \\ y_5 \\ y_6 \\ y_7 \end{bmatrix} = Wx = \begin{bmatrix} u_{00} & u_{10} & u_{20} & u_{20} & & & & \\ u_{01} & u_{11} & u_{21} & u_{21} & & 0 & & \\ u_{02} & u_{12} & u_{22} & u_{22} & & & & \\ u_{03} & u_{13} & u_{23} & u_{23} & & & & \\ & & & & u_{00} & u_{10} & u_{20} & u_{20} \\ & & 0 & & u_{01} & u_{11} & u_{21} & u_{21} \\ & & & & u_{02} & u_{12} & u_{22} & u_{22} \\ & & & & u_{03} & u_{13} & u_{23} & u_{23} \end{bmatrix} \begin{bmatrix} \begin{bmatrix} c_0 \\ c_1 \\ c_2 \\ c_3 \end{bmatrix} \\ \begin{bmatrix} \varphi_0 c_0 \\ \varphi_1 c_1 \\ \varphi_2 c_2 \\ \varphi_3 c_3 \end{bmatrix} \end{bmatrix} x, \quad (7)$$

wherein $$\begin{bmatrix} c_0 \\ c_1 \\ c_2 \\ c_3 \end{bmatrix}$$

is a binary vector (i.e., $c_i \in \{0,1\}$, i=0,1,2,3) for the selection of columns of the matrix, and $$\begin{bmatrix} \varphi_0 \\ \varphi_1 \\ \varphi_2 \\ \varphi_3 \end{bmatrix}$$

are the co-phasing factors for four precoding vectors of $u_0, u_1, u_2, u_3$. When the UE 115 selects q precoding vectors out of these four precoding vectors, the UE 115 should feedback q number of non-zero co-phasing factors. In this case, the PMI comprises information on $$\begin{bmatrix} c_0 \\ c_1 \\ c_2 \\ c_3 \end{bmatrix} \text{ and } \begin{bmatrix} \varphi_0 \\ \varphi_1 \\ \varphi_2 \\ \varphi_3 \end{bmatrix}.$$

In one example, $$[u_0, u_1, u_2, u_3] = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

and hard-coded. In this case, equivalently Q=2q CSI-RS ports are selected with the choice of q precoding vector.

Embodiment: CSI-RS for Long-Term CSI Estimation

Figure 9A:
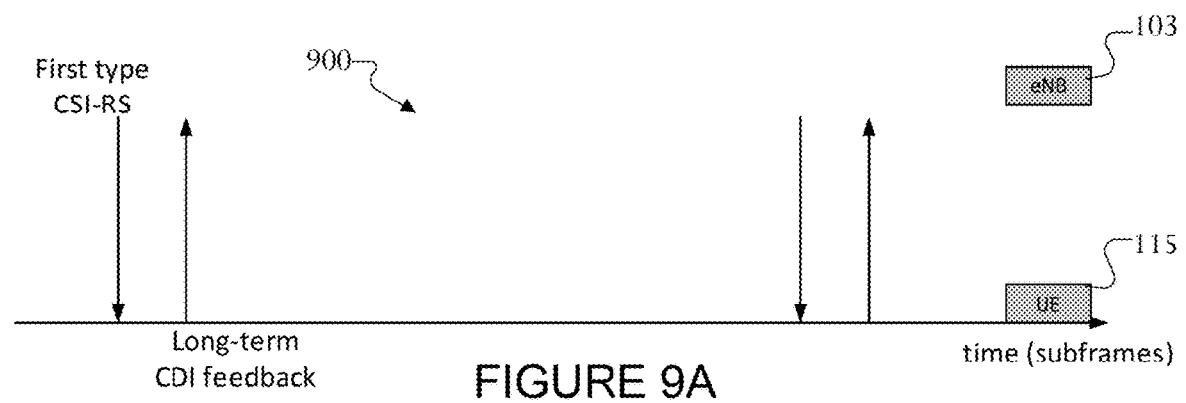
FIGS. 9A and 9B illustrate the eNB's transmission of two types of CSI-RS and corresponding UE's feedback according to this disclosure.
Figure 9B:
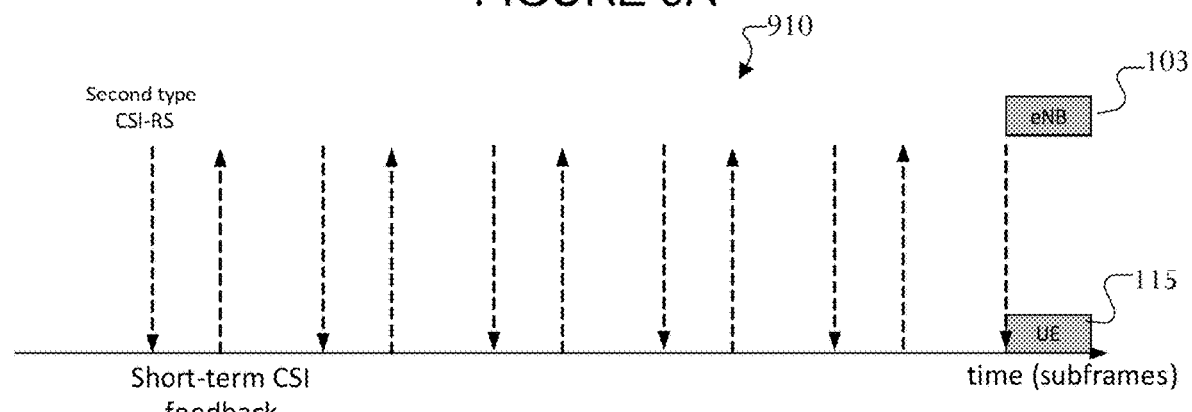

FIGS. 9A and 9B illustrate the eNB 115 transmission of two types 900, 910 of CSI-RS and corresponding UE 115 feedback according to certain embodiments of the present disclosure. The embodiment shown in FIG. 9 is for illustration only. Other embodiments could be used without departing from the scope of the present disclosure.

In these embodiments, eNB 103 configures two CSI-RS resources for a UE 115: (1) a first CSI-RS resource for a long-term channel direction estimation; and (2) a second CSI-RS resource for a short-term CSI estimation (e.g., co-phase, beam selection PMI, RI and CQI).

In another method, these two CSI-RS resources are configured in a single CSI process.

The eNB 103 can configure the duty cycle of CSI-RS transmission of the first CSI-RS resource longer than the second CSI-RS. Once eNB obtains long-term CDI from the UE 115, the eNB 103 UE-specifically pre-codes (or beamforms) the second CSI-RS based upon the long-term CDI, according to some embodiments of the present disclosure.

Utilizing channel estimates estimated with the first CSI-RS, the UE 115 estimates and feeds back long-term CDI. Utilizing channel estimates estimated with the second CSI-RS, the UE 115 estimates and feeds back co-phase information and beam selection information, according to some embodiments of the present disclosure. In one alternative, the UE 115 derives and feeds back rank information with the second CSI-RS; in another alternative the UE 115 derives and feeds back rank information with the first CSI-RS.

The second CSI-RS and related CSI feedback can be constructed/derived according to some embodiments of the present disclosure, in which the UE 115 drives short-term CSI out of Q (=q/2) antenna ports that can be decomposed into q pairs of antenna ports, and each pair comprises two antenna ports with the same beamforming vector but with different polarization.

In one method for the first CSI-RS resource, $N_P$ CSI-RS ports (in one example, $N_P$=P·M·N; in another example $N_P$=M·N according to the notation in the embodiments associated with FIG. 5) are configured for the first CSI-RS resource, and the $N_P$ CSI-RS ports are one-to-one mapped to the $N_P$ TXRUs in the antenna array. In this case, the UE 115 estimates channel direction information (CDI) from utilizing the channel estimates of the $N_P$ CSI-RS ports, and feeds back the CDI to the eNB. The CDI can be reported on either PUCCH or on PUSCH.

In one example, $N_P$=M·N, and the UE 115 is configured with a first and a second numbers of antenna ports, M and N, according to the notation in the embodiments associated with FIG. 5.

In another example, $N_P$=P·M·N, and the UE 115 is configured with a first, a second and a third numbers of antenna ports, M and N and P, according to the notation in the embodiments associated with FIG. 5.

In another example, $N_P$=P·M·N, and the UE 115 is configured with a first and a second numbers of antenna ports, P·M and N, according to the notation in the embodiments associated with FIG. 5.

In one example of the current method, the CDI is two oversampled DFT precoders: one for representing azimuth channel direction, and the other for representing elevation channel direction. In the later embodiments, DFT precoders/vectors and oversampled DFT vectors are interchangeably used. Furthermore, in case M=4, the DFT vector for the azimuth channel direction has four elements (here the number of elements in the DFT vector is equal to M):

$$v_a^{(A)}=[1\ e^{j2\pi a/A}\ e^{j4\pi a/A}\ e^{j6\pi a/A}]^T,\ a=0,1,\ldots A-1;\ \text{and}$$

In case N=4, the DFT vector for the elevation channel direction is (here the number of elements in the DFT vector is equal to N):

$$u_b^{(B)}=[1\ e^{j2\pi b/B}\ e^{j4\pi b/B}\ e^{j6\pi b/B}]^T,\ b=0,1,\ldots B-1,$$

wherein example values for A is 32, 16 and 8; and example values for B are 16, 8, 4. The feedback information of the UE 115 can comprise A·B states; if A=16 and B=8, then the number of states is 128, and it is a 7-bit information. The azimuth CDI and elevation CDI can be coded either separately as shown in TABLE 8 below, or jointly as shown in TABLE 9 below. The information field(s) are encoded and then mapped onto a PUSCH for aperiodic CSI feedback or a PUCCH resource for periodic CSI feedback.

TABLE 8

| CDI contents | Details | Information field |
| --- | --- | --- |
| Azimuth CDI | $v_a^{(A)} = [1\ e^{j2\pi a/A}\ e^{j4\pi a/A}\ e^{j6\pi a/A}]^T$, $a = 0, 1, \ldots A - 1, A = 16$ | A 4-bit information field |
| Elevation CDI | $u_b^{(B)} = [1\ e^{j2\pi b/B}\ e^{j4\pi b/B}\ e^{j6\pi b/B}]^T$, $b = 0, 1, \ldots B - 1, B = 8$ | A 3-bit information field |

TABLE 9

| CDI contents | Details | Information field |
| --- | --- | --- |
| Azimuth & Elevation CDI | $v_a^{(A)} = [1\ e^{j2\pi a/A}\ e^{j4\pi a/A}\ e^{j6\pi a/A}]^T$, $a = 0, 1, \ldots A - 1, A = 16$ $u_b^{(B)} = [1\ e^{j2\pi b/B}\ e^{j4\pi b/B}\ e^{j6\pi b/B}]^T$, $b = 0, 1, \ldots B - 1, B = 8$ | A 7-bit information field |

In another example with M=4 and N=4, the DFT vector for the azimuth channel direction has four elements (here the number of elements in the DFT vector is equal to M): $v_a^{(A)}=[1\ e^{j2\pi a/A}\ e^{j4\pi a/A}\ e^{j6\pi a/A}]^T$, $a=0, 1, \ldots A-1$; and the DFT vector for the elevation channel direction is (here the number of elements in the DFT vector is equal to N): $u_b^{(B)}=[1\ e^{j2\pi b/B}]^T$, $b=0, 1, \ldots B-1$.

One possible way to feedback the CDI in this case is illustrated in the following TABLE 10 below.

TABLE 10

| CDI contents | Details | Information field |
| --- | --- | --- |
| Azimuth CDI | $v_a^{(A)} = [1\ e^{j2\pi a/A}\ e^{j4\pi a/A}\ e^{j6\pi a/A}]^T$, $a = 0, 1, \ldots A - 1, A = 16$ | A 4-bit information field |
| Elevation CDI | $u_b^{(B)} = [1\ e^{j2\pi b/B}]^T$, $b = 0, 1, \ldots B - 1, B = 4$ | A 2-bit information field |

In another example of the current method, the CDI is a set of L vectors in a form of $v_a \otimes u_b$, or alternatively $u_b \otimes v_a$, and information field for the CDI will contain information on the L index pairs: $\{(a_l,b_l)\}_{l=0}^{L-1}$.

U.S. Provisional Patent Application No. 62/073,782 filed on Oct. 31, 2014, which is incorporated herewith in its entirety, has shown a couple of methods to encode this type of CDI information. One example method to quantize azimuth CDI is described in the following TABLE 11, wherein A=32 is assumed:

TABLE 11

| Vector set indicator index (5 bits) | Vector combination index (i) | Selected vector set (CDI) |
| --- | --- | --- |
| 0, . . . , 15 | 0, . . . 15 | $\{v_{2i}, v_{2i+1}, v_{2i+2}, v_{2i+3}\}$ |
| 16, . . . , 23 | 0, . . . , 7 | $\{v_{4i}, v_{4i+2}, v_{4i+4}, v_{4i+6}\}$ |
| 24, . . . , 27 | 0, . . . , 3 | $\{v_{8i}, v_{8i+4}, v_{8i+8}, v_{8i+12}\}$ |
| 28 (Option 1) | 0 | $\{v_0, v_8, v_{16}, v_{24}\}$ |
| 29, 30, 31 (Option 1) | Reserved | |
| 28, 29, 30, 31 (Option 2) | 0, . . . , 3 | $\{v_{2i+0}, v_{2i+8}, v_{2i+16}, v_{2i+24}\}$ |

Another example method to quantize azimuth CDI is described in the following TABLE 12, wherein A=32 is assumed:

TABLE 12

| Vector set indicator index (4 bits) | Vector combination index (i) | Selected vector set (CDI) |
| --- | --- | --- |
| 0, . . . , 15 | 0, . . . 15 | $\{v_{2i}, v_{2i+1}, v_{2i+2}, v_{2i+3}\}$ |

It is noted that the elevation CDI can also be similarly quantized as the azimuth CDI.

Embodiment: CSI-RS for Long-Term CSI Estimation

An eNB 103 has a 2D TXRU array with (M, N, P)=(4, 4, 2), according to the notation associated with the embodiments related to FIG. 5. In this case the total number of TXRUs is 32. In this embodiment, the eNB 103 configures a UE 115 with $N_P$ CSI-RS ports wherein $N_P$=M·N=16 for the first type of CSI-RS that can be decomposed into (M, N, $P_{\text{effective}}$)=(4, 4, 1), so that the UE 115 can estimate a long-term CDI.

In one method, these 16 CSI-RS antenna ports are one-to-one mapped to 16 TXRUs associated with a same antenna polarization. For example, 16 CSI-RS antenna ports are one-to-one mapped to TXRUs (0, 0, 0), (0, 1, 0), (0, 2, 0), (0, 3, 0), (1, 0, 0), (1, 1, 0), (1, 2, 0), (1, 3, 0), (2, 0, 0), (2, 1, 0), (2, 2, 0), (2, 3, 0), (3, 0, 0), (3, 1, 0), (3, 2, 0), (3, 3, 0).

Figure 10:
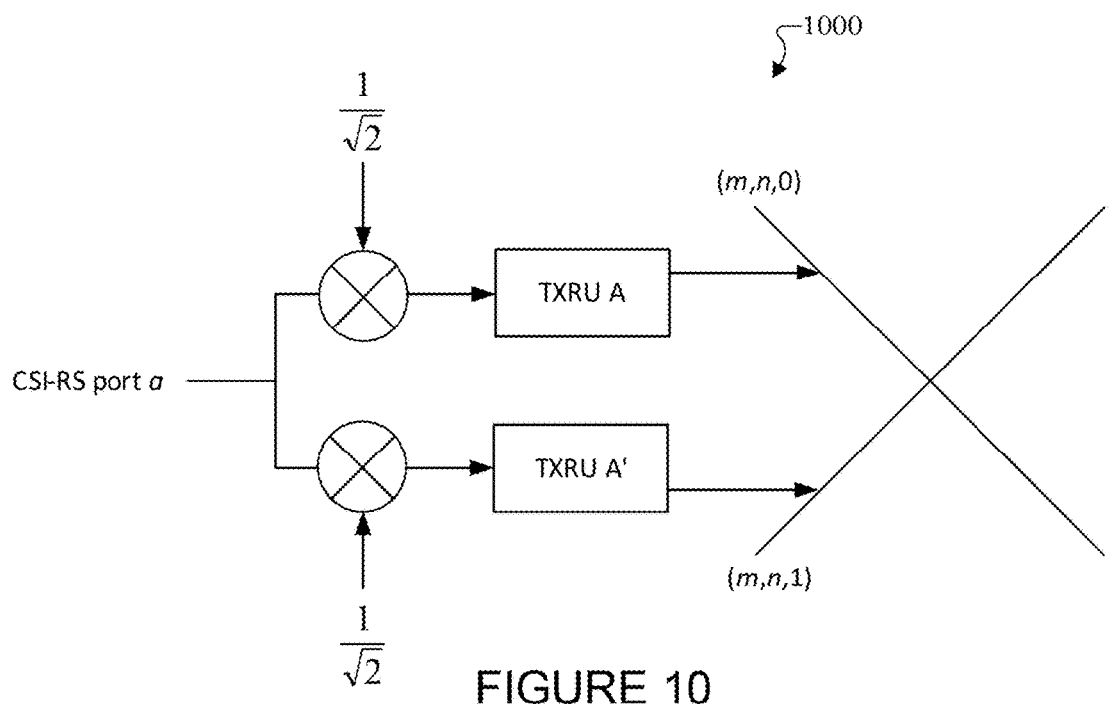
FIG. 10 illustrates the example CSI-RS port virtualization implementation according to this disclosure.

FIG. 10 illustrates the example CSI-RS port virtualization implementation 1000: 16 ports to feed 32 TXRUs according to embodiments of the present disclosure. The embodiment shown in FIG. 10 is for illustration only. Other embodiments could be used without departing from the scope of the present disclosure.

In another method, these 16 CSI-RS antenna ports are mapped to 32 TXRUs, wherein each CSI-RS port is associated with a pair of TXRUs (m,n,0) and (m,n,1). In one example, the association weight of each CSI-RS port to the pair of TXRUs (labeled as TXRU A and TXRU A') can be [+1+1]/sqrt(2), as illustrated in FIG. 10. In the figure, CSI-RS port a is split into two branches and respectively scaled with 1/sqrt(2), and then fed onto TXRUs A and A' which are associated with antenna subarray (m,n,0) and (m,n,1). It is noted that the particular precoding weights are just for illustration.

The eNB 103 with (M, N, P)=(4, 4, 2) can additionally configures and transmits the second type of CSI-RS. The second type of CSI-RS is precoded with a precoder selected based upon the CDI feedback of the UE 115, according to some embodiments of the present disclosure, in which the UE 115 drives short-term CSI out of Q (=q/2) antenna ports that can be decomposed into q pairs of antenna ports, and each pair comprises two antenna ports with the same beamforming vector but with different polarization.

In another method for the first CSI-RS resource, $N_B$ CSI-RS ports are configured for the first CSI-RS resource, and the $N_B$ CSI-RS ports are beamformed, i.e., precoding weights are applied to each CSI-RS to be mapped onto the $N_P$ TXRUs in the antenna array. In this case, the CDI that the UE 115 estimates can be a selected set of CSI-RS ports out of the $N_B$ CSI-RS ports.

The UE 115 can select L CSI-RS ports which have the L strongest received power among $N_B$ CSI-RS ports. Some example values of L is L=1 and L=4.

After selecting L such CSI-RS ports, the UE 115 reports information on the selected L CSI-RS ports to the eNB on PUSCH or on PUCCH

Embodiment: Coarsely Beamformed CSI-RS for Long-Term CSI Estimation

As in some embodiments of the present disclosure, assume that the DFT vector for the azimuth channel direction is:

$$v_a^{(A)}=[1\, e^{j2\pi a/A}\, e^{j4\pi a/A}\, e^{j6\pi a/A}]^T, \; a=0,1,\ldots A-1; \text{ and} \quad (8)$$

the DFT vector for the elevation channel direction is:

$$u_b^{(B)}=[1\, e^{j2\pi b/B}\, e^{j4\pi b/B}\, e^{j6\pi b/B}]^T, \; b=0,1,\ldots B-1, \quad (9)$$

Then the azimuth and the elevation DFT beam index space (a, b) is partitioned into a grid comprising A·B components.

In this embodiment, eNB 103 configures the first and the second CSI-RS resources for a UE. Both the first CSI-RS and the second CSI-RS are beamformed, but the first CSI-RS beams are coarsely packed than the second CSI-RS beams; in other words, the first CSI-RS beams are wider than the second CSI-RS beams. In one example, the first CSI-RS beam is constructed with A=8 and B=4; and the second CSI-RS beam is constructed with A'=16 and B'=4.

Figure 11A:
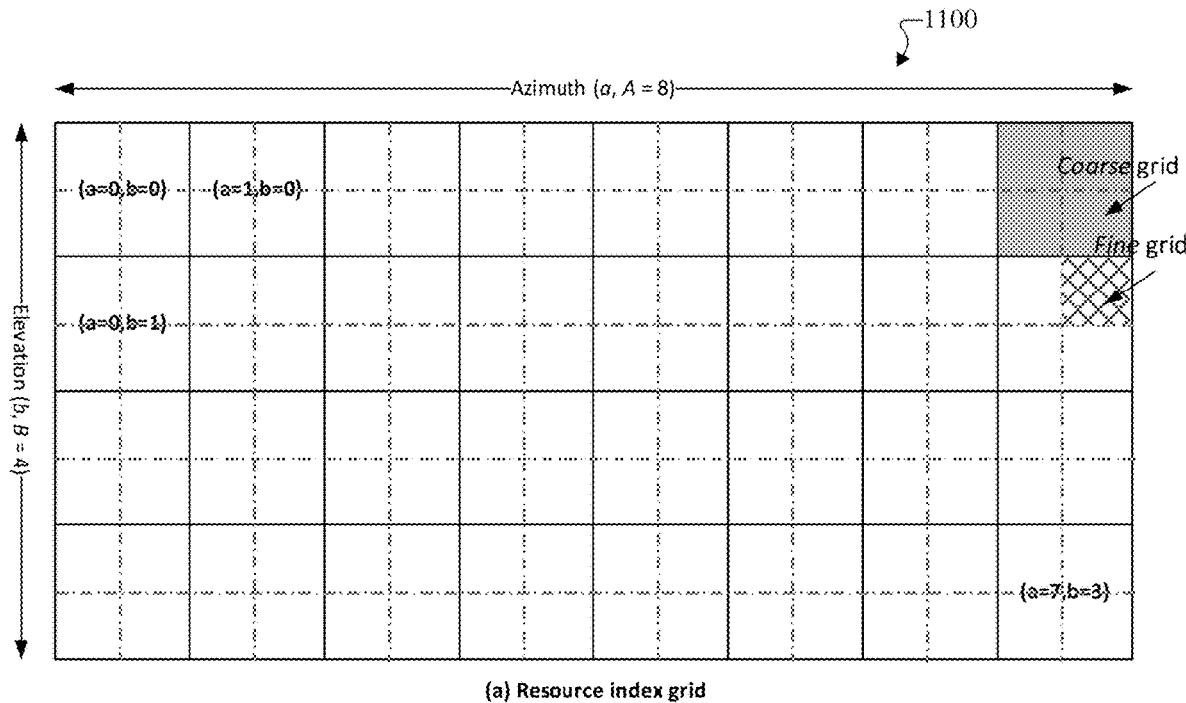
FIGS. 11A and 11B illustrate DFT beam index grids according to this disclosure.
Figure 11B:
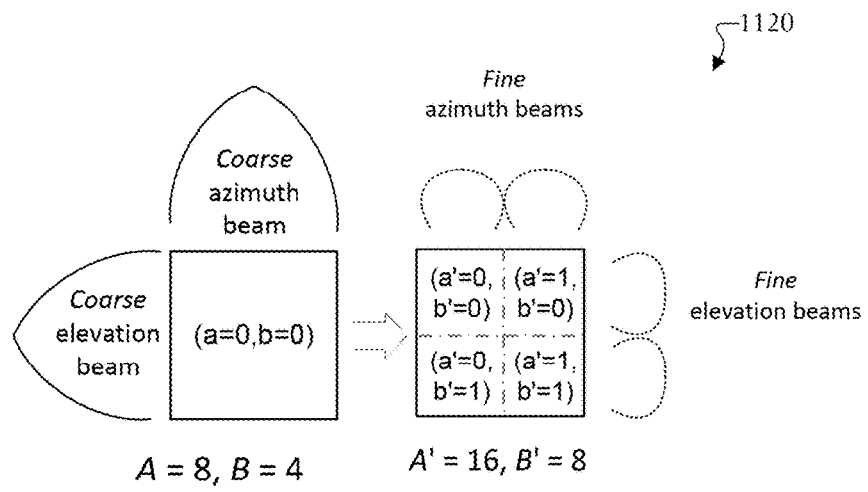

FIGS. 11A and 11B illustrate DFT beam index grids 1100 according to embodiments of the present disclosure. The embodiments shown in FIGS. 11A and 11B are for illustration only. Other embodiments could be used without departing from the scope of the present disclosure.

For the first CSI-RS resource, eNB can configure A=8 and B=4, and transmit A·B=32 port beamformed CSI-RS as illustrated. In FIG. 10A, both fine and coarse grids are illustrated. The coarse grid comprises 32 elements, each indexed with (a, b), where a=0, 1, . . . , A−1 and b=0, 1, . . . , B−1; similarly, the fine grid comprises 108 elements, each indexed with (a', b'), where a'=0, 1, . . . , A'−1 and b'=0, 1, . . . , B'−1 and A'=2A and B'=2B. An element (a, b) in a coarse grid correspond to a CSI-RS beam precoded with a precoding vector $v_a^{(A)} \otimes u_b^{(B)}$, similarly. An element (a', b') in a fine grid correspond to a CSI-RS beam precoded with a precoding vector $v_{a'}^{(A')} \otimes u_{b'}^{(B')}$. Then, the eNB 103 receives beam index feedback from a UE 115, wherein the beam index is estimated relying on the 32-port beamformed CSI-RS. In one example, the eNB 103 gets feedback of beam index pair of (a, b)=(0, 0) corresponding to $v_0^{(A)} \otimes u_0^{(B)}$ from the UE 115. Then, for the UE 115, the eNB 103 transmits multiple finer beam CSI-RS (with A'>A and B'>B) on the second CSI-RS resource according to some embodiments of the present disclosure, so that the UE 115 can derive and feedback the beam selection and the co-phase information to the eNB 103.

In the example in FIG. 11B, the multiple finer beams correspond to (a', b')=(0, 0), (1, 0), (0, 1), (1,1) with A'=16 and B'=8, corresponding to and $v_0^{(A')} \otimes u_0^{(B')}$, $v_0^{(A')} \otimes u_1^{(B')}$, $v_1^{(A')} \otimes u_0^{(B')}$ and $v_1^{(A')} \otimes u_1^{(B')}$.

In another example, the multiple finer beams can correspond to 4 finer azimuth beams, i.e., (a', b')=(0, 0), (1, 0), (2, 0), (3, 0) with A'=32, corresponding to $v_0^{(A')} \otimes u_0^{(B)}$, $v_1^{(A')} \otimes u_0^{(B)}$, $v_2^{(A')} \otimes u_0^{(B)}$ and $v_3^{(A')} \otimes u_0^{(B)}$.

Figure 12:
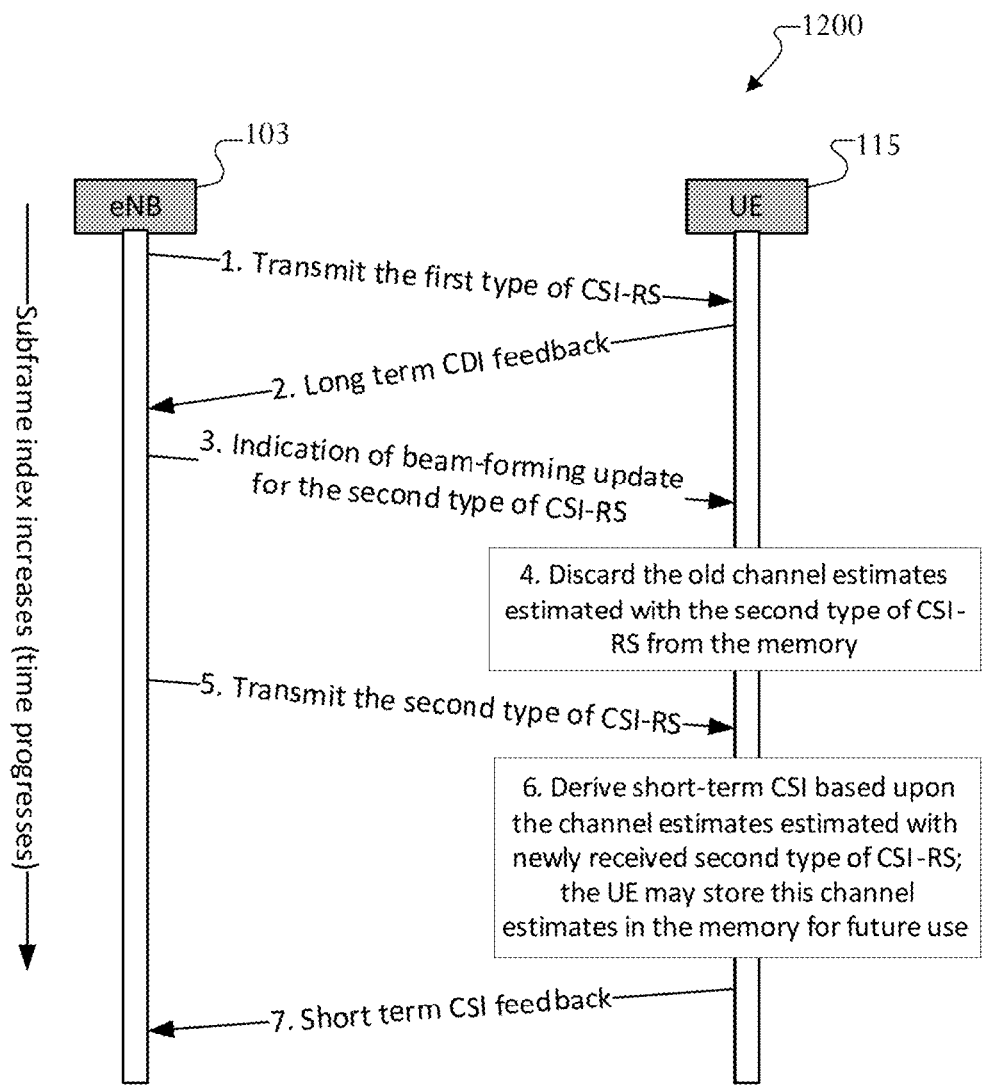
FIG. 12 illustrates a flowchart regarding a UE and eNB operation related to short-term CSI feedback according to this disclosure.

Embodiment: (CQI Estimation Time Window in Relation to the Two Types of CSI-RS FIG. 12 illustrates a flowchart 1200 regarding a UE 115 and eNB 103 operation related to short-term CSI feedback according to some embodiments of the present disclosure. While the signal diagram depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a processing circuitry in, for example, a UE, eNB or other entity.

In the embodiments, a UE 115 is configured with the two types of CSI-RS resources: (1) a first CSI-RS resource for long-term channel direction estimation; and (2) a second CSI-RS resource for co-phase and beam selection.

In Step 1, the UE 115 receives the first type of CSI-RS from the eNB 103.

In Step 2, the UE derives and feeds back the CDI utilizing the CSI-RS transmitted on the first CSI-RS resource.

In Step 3, the eNB 103 can decide to update the precoders for the second type of CSI-RS based upon the CDI feedback. In such a case, the eNB sends an indication to the UE 115, of beamforming update of the second type of CSI-RS. The indication can be transmitted and configured in the higher-layer (MAC or RRC), or dynamically indicated in a downlink control information (DCI) on the PHY layer on PDCCH.

In Step 4, after receiving the indication, the UE 115 discards the old channel estimates estimated with the second type of CSI-RS from the memory.

In Step 5, the eNB 103 transmits the second type of CSI-RS precoded with the new precoders derived utilizing the feedback CDI to the UE, after sending the indication message. In some embodiments, Step 4 can occur later than Step 5.

In step 6, after discarding the old channel estimates and after receiving second type of CSI-RS for the first time after receiving the indication message, the UE 115 derives new short term CSI based upon the second type of CSI-RS.

In Step 7, the UE feeds back the short term CSI to eNB 103.

The UE 103 can store the channel estimates estimated with the second type of CSI-RS for future use. For example, the UE channel estimate can take multiple channel estimates from multiple past subframes as input to make the channel estimates more reliable.

Figure 13:
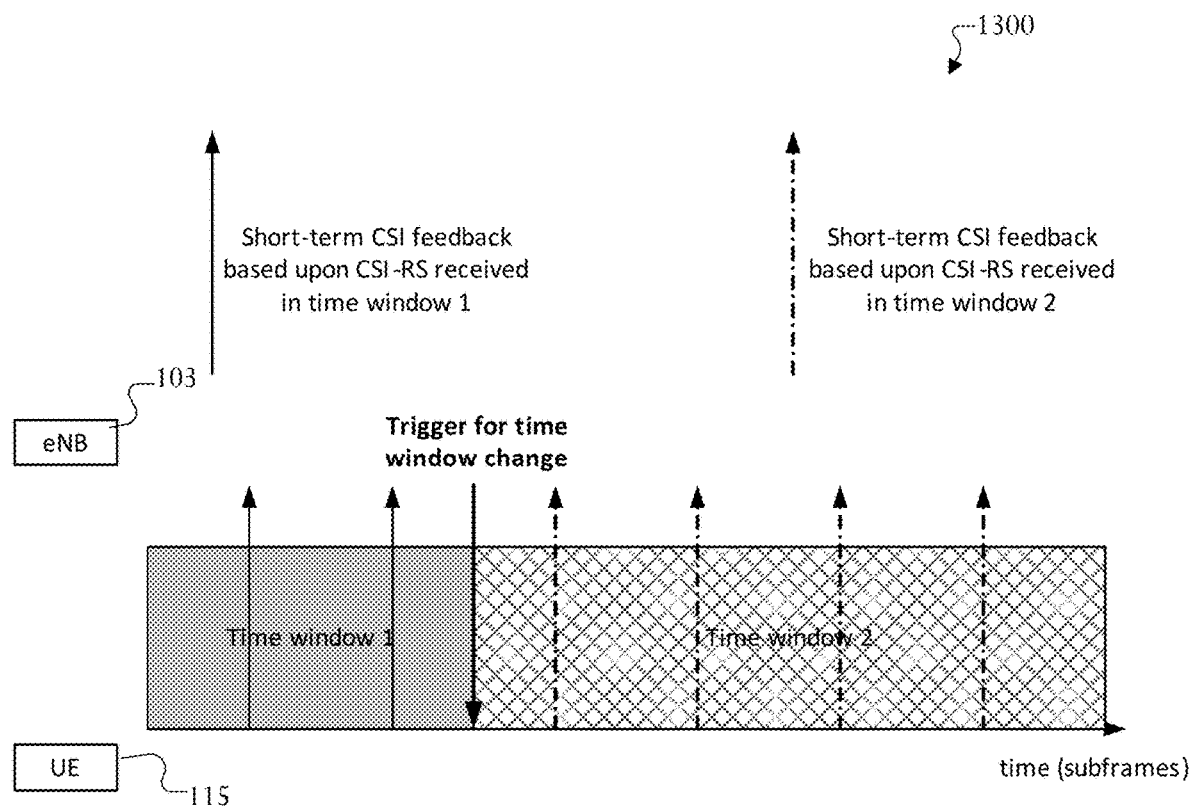
FIG. 13 illustrates a short-term CSI estimation time window according to this disclosure.

FIG. 13 illustrates a short-term CSI estimation time window 1300 according to some embodiments of the present disclosure. The embodiment shown in FIG. 13 is for illustration only. Other embodiments could be used without departing from the scope of the present disclosure.

The UE 115 generates short-term CSI feedback based upon CSI-RS channel estimates within a time window, and the UE 115 does not take different CSI-RS channel estimates from two different time windows as input for generating short-term CSI.

The UE 115 determines when to switch to a new time window, based upon a trigger.

In one method, the trigger is reception of the indication message of beamforming update for the second set of CSI-RS.

In another method, the trigger is acknowledgement of reception of the indication message of beamforming update for the second type of CSI-RS, wherein the acknowledgement is sent by the UE 115 to the eNB 103.

In another method, the trigger is reception of the second type of CSI-RS received immediately after the indication message of beamforming precoder update for the second type of CSI-RS.

In another method, the trigger is reception of the first type of CSI-RS. During a time window between two consecutive receptions of first type of CSI-RS, the UE 115 can assume that the short-term CSI can be derived with the second type of CSI-RS received in the time window.

In another method, the time window is a single subframe in which the second type of CSI-RS is received.

Method: Collision Handling of Long-Term CSI Feedback and Short-Term CSI Feedback In some embodiments, UE 115 is configured to report long-term CSI on a first PUCCH resource according to a first periodic CSI feedback configuration, and short-term CSI on a second PUCCH resource according to a second periodic CSI feedback configuration. In a particular subframe the UE 115 finds the both CSI reports are scheduled, the UE 115 is configured to drop the short-term CSI feedback and to report the long-term CSI only on the first PUCCH resource. This method is motivated by the fact that the long-term information is more important than the short-term information.

Method: (Two CSI Processes for Long-Term and Short-Term CSI Feedback

In some embodiments, UE 115 is configured with two CSI processes: a first CSI process with the first type of CSI-RS for CDI feedback and a second CSI process with the second type of CSI-RS for short-term CSI feedback. The first and the second CSI process configurations can also have their own CSI-IM, periodic CSI and aperiodic CSI configurations. The periodic CSI configuration can include a PUCCH resource, reporting frequency and reporting time offset.

Method: (One CSI Process for Long-Term and Short-Term CSI Feedback)

In some embodiments, UE 115 is configured with one CSI process with the two types of CSI-RS. The CSI process configuration can also have CSI-IM, periodic CSI and aperiodic CSI configurations. The periodic CSI configuration can include a PUCCH resource, reporting frequency and reporting time offset.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A base station capable of communicating with a user equipment (UE), the base station comprising:
   a controller; and
   a transceiver configured to:
      transmit a signal comprising a channel state information (CSI) process configuration, wherein the CSI process configuration comprises at least a first CSI reference signal (CSI-RS) resource configuration to identify CSI-RS resources, and
      receive, from the UE, a first CSI feedback comprising a first precoding matrix index (PMI) less frequently than a second CSI feedback comprising a channel quality indicator (CQI) and a second PMI,
   wherein the first PMI is derived utilizing a first CSI-RS on a first CSI-RS resource, and the CQI and the second PMI are derived by utilizing a second CSI-RS on a second CSI-RS resource.

2. The base station of claim 1, wherein two CSI-RSs on antenna ports 15 and 19 among 8 CSI-RSs are respectively mapped onto a first group and a second group of a same number of antenna elements with substantially similar beamforming weight vectors being applied,
   wherein an antenna element on the first group is polarized according to a first angle, an antenna element on the second group is polarized according to a second angle, and two antenna elements on the first and the second groups are on a same physical location comprising a dual-polarized pair, and
   wherein a difference between the first and the second angles is substantially equal to 90 degrees.

3. The base station of claim 1, wherein the first PMI corresponds to discrete Fourier transform (DFT) vectors.

4. The base station of claim 1, wherein the first and second CSI-RSs are beamformed with a beamforming weight vector, and
wherein the controller is configured to derive the beamforming weight vector by processing a precoding vector reported by the UE.

5. The base station of claim 4, wherein the transceiver is further configured to:
transmit
downlink signals containing a second CSI-RS configuration on a physical downlink shared channel (PDSCH), and
N-port CSI-RS according to the second CSI-RS configuration, wherein N is a positive integer; and
receive, from the UE, uplink signals containing the second PMI comprising a nonnegative integer derived using the N-port CSI-RS,
wherein the controller is further configured to determine a precoding vector as an oversampled discrete Fourier transform (DFT) vector according to the second PMI.

6. The base station of claim 5, wherein the transceiver is further configured to:
transmit
downlink signals containing the second CSI-RS configuration on the PDSCH, and
N-port CSI-RS according to the second CSI-RS configuration; and
receive uplink signals from the UE containing the second PMI comprising two nonnegative integers derived using the N-port CSI-RS,
wherein the controller is further configured to determine a precoding vector as a Kronecker product of two oversampled DFT vectors corresponding to the second PMI.

7. The base station of claim 6, wherein N CSI-RS are mapped to a 2-dimensional array of $N_2$ transceiver units respectively mapped to N antenna subarrays placed on a 2-dimensional antenna panel.

8. A method for communicating with a user equipment (UE), the method comprising:
transmitting, by a transmitter in a base station (BS), a signal comprising a channel state information (CSI) process configuration, wherein the CSI process configuration comprises at least a first CSI reference signal (CSI-RS) resource configuration to identify CSI-RS resources; and
receiving, from the UE, a first CSI feedback comprising a first precoding matrix indicator (PMI) less frequently than a second CSI feedback comprising a channel quality indicator (CQI) and a second PMI,
wherein the first PMI is derived utilizing a first CSI-RS on a first CSI-RS resource, and the CQI and the second PMI are derived by utilizing a second CSI-RS on a second CSI-RS resource.

9. The method of claim 8, wherein two CSI-RS on antenna ports 15 and 19 among 8 CSI-RSs are respectively mapped onto a first group and a second group of a same number of antenna elements with substantially similar beamforming weight vectors being applied,
wherein an antenna element on the first group is polarized according to a first angle, an antenna element on the second group is polarized according to a second angle, and two antenna elements on the first and the second groups are on a same physical location comprising a dual-polarized pair,
wherein a difference between the first and the second angles is substantially equal to 180 degrees.

10. The method of claim 8, wherein the first PMI corresponds to discrete Fourier transform (DFT) vectors.

11. The method of claim 8, wherein the first and second CSI-RSs are beamformed with a beamforming weight vector, and wherein the method further comprises deriving the beamforming weight vector by processing a precoding vector reported by the UE.

12. The method of claim 11, further comprising:
transmitting downlink signals containing a second CSI-RS configuration on a physical downlink shared channel (PDSCH), and N-port CSI-RS according to the second CSI-RS configuration;
receiving, from the UE, uplink signals containing the second PMI comprising a non-negative integer derived using the N-port CSI-RS; and
determining a precoding vector as an oversampled discrete Fourier transform (DFT) vector according to the second PMI.

13. The method of claim 12, further comprising:
transmitting
downlink signals containing the second CSI-RS configuration on PDSCH, and
the N-port CSI-RS according to the second CSI-RS configuration;
receiving uplink signals from the UE containing the second PMI comprising two nonnegative integers derived using the N-port CSI-RS; and
determining a precoding vector as a Kronecker product of two oversampled DFT vectors corresponding to the second PMI.

14. The method of claim 13, wherein the N-port CSI-RS are mapped to a 2-dimensional array of N transceiver units respectively mapped to N antenna subarrays placed on a 2-dimensional antenna panel.

15. A user equipment (UE) capable of communicating with a base station, the UE comprising:
a transceiver configured to receive a signal comprising a channel state information (CSI process configuration, wherein the CSI process configuration comprises at least a first CSI reference signal (CSI-RS) resource configuration to identify CSI-RS resources; and
a controller configured to:
derive a first precoding matrix index (PMI) utilizing a first CSI-RS on a first CSI-RS resource,
derive a channel quality indicator (CQI) and a second PMI utilizing a second CSI-RS on a second CSI-RS resource, and
cause the transceiver to transmit a first CSI feedback comprising the first PMI less frequently than a second CSI feedback comprising the CQI and the second PMI.

16. The UE of claim 15, the transceiver is further configured to:
receive N-port CSI-RS according to a second CSI-RS configuration and downlink signals containing the second CSI-RS configuration on a physical downlink shared channel (PDSCH),
transmit uplink signals containing a second PMI,
wherein the controller is further configured to derive the second PMI by utilizing channel estimates using the received N-port CSI-RS, and
wherein the second PMI comprises one nonnegative integer indicating an oversampled discrete Fourier transform (DFT) vector.

17. The UE of claim 15, wherein the transceiver is further configured to:
- receive N-port CSI-RS according to a second CSI-RS configuration and downlink signals containing the second CSI-RS configuration on a physical downlink shared channel (PDSCH), and
- transmit uplink signals containing a second PMI,
- wherein the controller is further configured to derive the second PMI by utilizing channel estimates using the received N-port CSI-RS, and
- wherein the second PMI comprises two non-negative integers indicating each of two oversampled discrete Fourier transform (DFT) vectors and indicates a Kronecker product of two oversampled DFT vectors.

18. The UE of claim 15, wherein the first PMI corresponds to discrete Fourier transform (DFT) vectors.

19. The UE of claim 15, wherein the transceiver is further configured to receive downlink signals containing information on a trigger of a time window change for channel estimation, and
- wherein the controller is further configured to:
  - determine trigger timing to start a new channel estimation window from the downlink signals,
  - derive the second PMI using an 8-port CSI-RS transmitted within a time window, and
  - discard the channel estimate for the 8-port CSI-RS according to the trigger timing.

* * * * *